United States Patent [19]
Iwafuchi et al.

[11] Patent Number: 5,907,148
[45] Date of Patent: May 25, 1999

[54] PORTABLE READING APPARATUS FOR SCAN-READING A CODE USING A LASER LIGHT BEAM

[75] Inventors: Masahiko Iwafuchi, Hidaka; Yutaka Takeuchi, Mizuhomachi; Junichi Yoshida, Hamura; Hiroaki Takatsudo, Hachioji; Masanobu Sugimoto, Ome; Hodaka Hyoudou, Sagamihara; Eiichi Nara, Tokorozawa, all of Japan

[73] Assignee: Casio Computer Co., Ltd., Tokyo, Japan

[21] Appl. No.: 08/931,231

[22] Filed: Sep. 16, 1997

Related U.S. Application Data

[63] Continuation of application No. 08/394,618, Feb. 27, 1995, abandoned.

[30] Foreign Application Priority Data

Aug. 22, 1994 [JP] Japan ................................. 6-218314
Oct. 31, 1994 [JP] Japan ................................. 6-288723

[51] Int. Cl.$^6$ .................................................. G06K 07/10
[52] U.S. Cl. ................................ 235/472.01; 235/462.45
[58] Field of Search .................................. 235/472, 462, 235/462.43, 462.45, 472.01

[56] References Cited

U.S. PATENT DOCUMENTS

| | | | |
|---|---|---|---|
| 4,516,017 | 5/1985 | Hara et al. ............................... | 235/472 |
| 4,894,523 | 1/1990 | Chadima et al. ......................... | 235/472 |
| 4,930,848 | 6/1990 | Knowles ............................... | 235/472 X |
| 5,210,802 | 5/1993 | Sakai ....................................... | 235/462 |
| 5,260,553 | 11/1993 | Rockstein et al. ....................... | 235/462 |
| 5,285,056 | 2/1994 | Tedesco et al. ......................... | 235/472 |
| 5,354,977 | 10/1994 | Roustari et al. ........................ | 235/462 |
| 5,489,770 | 2/1996 | Kadota et al. .......................... | 235/472 |
| 5,597,997 | 1/1997 | Obata et al. ............................ | 235/462 |

FOREIGN PATENT DOCUMENTS

| | | | |
|---|---|---|---|
| 4-149790 | 5/1992 | Japan ..................................... | 235/472 |

*Primary Examiner*—Anita Pellman Gross
*Assistant Examiner*—Mark Tremblay
*Attorney, Agent, or Firm*—Frishauf, Holtz, Goodman, Langer & Chick

[57] ABSTRACT

A scanner for reading an object having a width larger than that of the distal end portion of a scanner main body, has an exit opening for outputting a light beam formed at the distal end portion of the scanner main body. An LED for generating a light beam, and a solid-state image pickup element for receiving the light beam which is reflected by the code, are arranged in the scanner main body. A gap portion for increasing the irradiation width of the light beam to be larger than the width of the distal end portion of the scanner main body is formed at the distal end portion of the scanner main body. Therefore, when a code is read by bringing the scanner main body close to or into contact with the code, the gap portion increases the width of the light beam to be larger than that of the distal end portion of the scanner main body, and therefore, a code having a width larger than the width of the distal end portion of the scanner main body can be read.

11 Claims, 24 Drawing Sheets

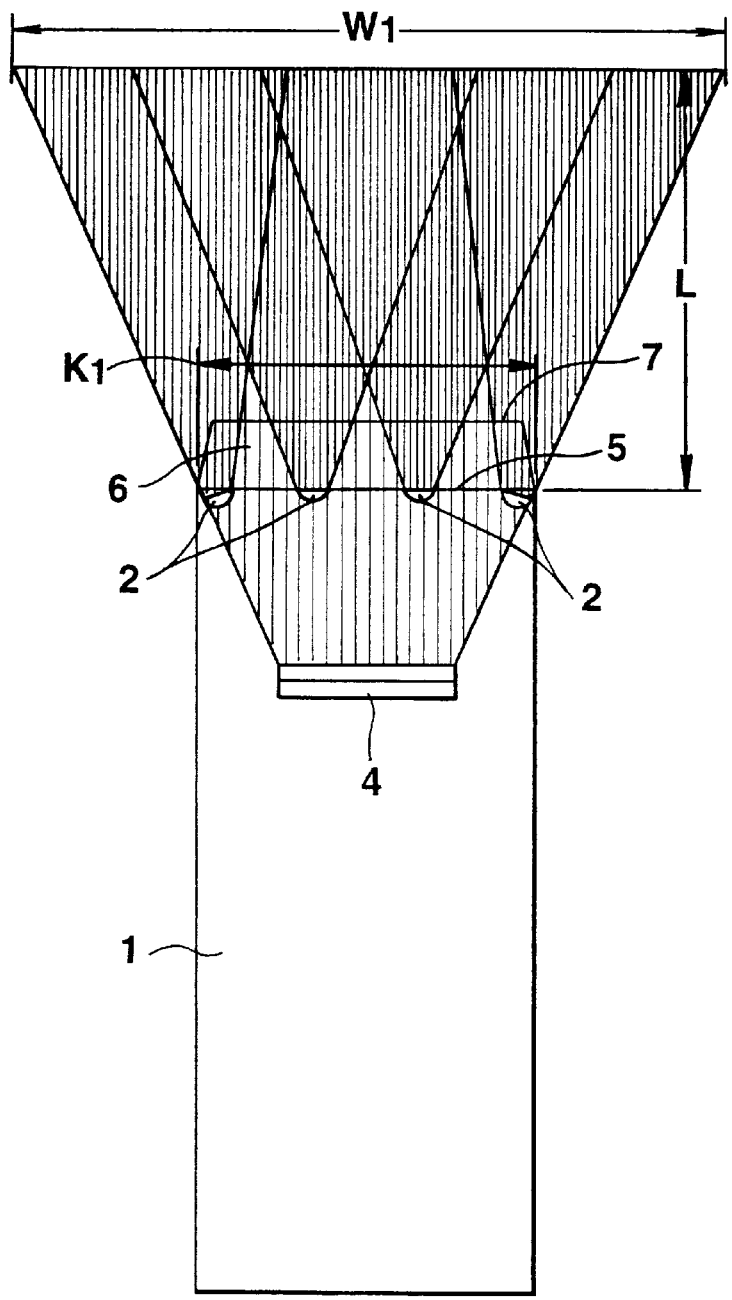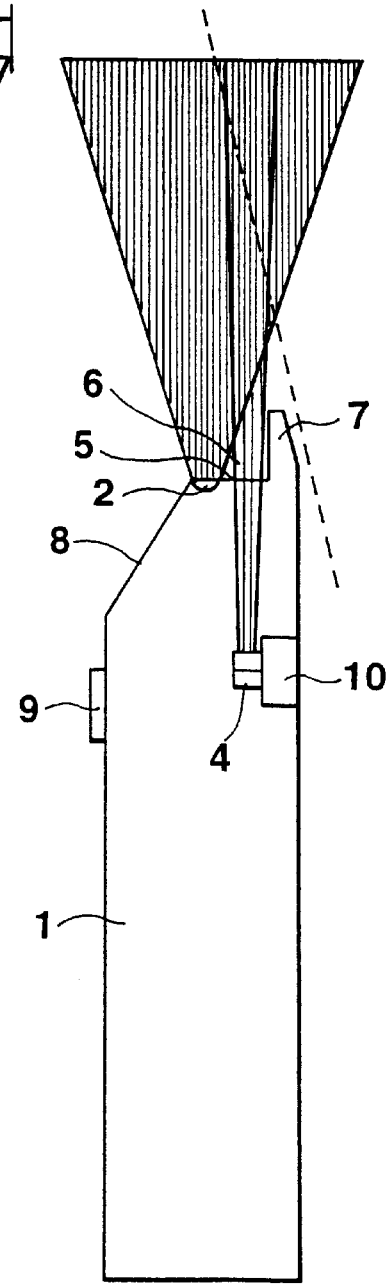
FIG.2A   FIG.2B

PORTABLE READING APPARATUS FOR SCAN-READING A CODE USING A LASER LIGHT BEAM

This application is a Continuation of application Ser. No. 08/394,618, filed Feb. 27, 1995, now abandoned.

BACKGROUND OF THE INVENTION

1. Field of the Invention

The present invention relates to a portable scanner for reading an image of an object to be read such as barcode symbols, and the like using a light source such as a laser beam, LED, or the like.

2. Description of the Related Art

As handy type scanners for optically reading an image of an object to be read such as a barcode, a touch scanner which utilizes a light-emitting diode (to be abbreviated as an LED hereinafter) as a light source, a laser scanner which utilizes a laser beam with a strong directivity, and the like are available.

The touch scanner comprises an LED and a light-receiving unit in its scanner main body. Light emitted from the LED is output from the exit opening of the scanner main body, and is irradiated onto a barcode. The light reflected by the barcode is received by the light-receiving unit to optically read the barcode. Since this touch scanner must read a barcode in a state wherein the distal end portion of the scanner main body covers the barcode, the readable distance is as small as 0 to 50 mm from the distal end of the scanner main body. Note that this touch scanner has an exit opening on the lower surface, on the distal end side, of the scanner main body, and a light-shielding portion for preventing the light-receiving unit from being influenced by external light extends almost vertically around the exit opening.

The laser scanner comprises a laser light source (to be referred to as a laser oscillator hereinafter), a scanning mirror, a light-receiving unit, and the like in its scanner main body. A laser beam emitted from the laser oscillator is output from the exit port of the scanner main body while being periodically oscillated by the scanning mirror, and is scanned on a barcode separated therefrom. The laser beam reflected by the barcode is received by the light-receiving unit, thereby reading the barcode separated from the scanner by a given distance. Since this laser scanner uses the laser beam with a strong directivity, the distance from the exit opening of the scanner main body to the shortest reading position is as large as several cm to several tens cm, and gun type (pistol type) scanners are popular to allow easy aiming with respect to a barcode separated therefrom.

However, since the above-mentioned touch scanner cannot accurately read a barcode unless the distal end portion of the scanner main body is brought close to or into contact with the barcode to cover it, it cannot read a barcode separated therefrom. In addition, although the touch scanner can read a barcode which is slightly larger than the exit opening of the distal end portion of the scanner main body, it cannot read a barcode larger than such a barcode. Furthermore, since a barcode in reading cannot be visually observed, the reading position cannot be confirmed.

The above-mentioned laser scanner can satisfactorily read a barcode separated therefrom by a given distance since it uses a laser beam with a strong directivity. However, the laser scanner cannot read a barcode in a state wherein the distal end portion of the scanner main body is brought close to or into contact with the barcode. In addition, when a barcode is set vertically, it can be easily read since the scanner main body can be held almost horizontally. However, when a barcode is set horizontally, the scanner main body must be held almost vertically, and is not easy to hold, resulting in difficult alignment of the scanner main body to the barcode, poor operability, and difficult reading operation.

SUMMARY OF THE INVENTION

It is the first object of the present invention to provide a portable scanner which can read an object to be read which has a width larger than that of the distal end portion of the scanner main body when the object to be read is read while bringing the scanner main body close to or into contact with the object to be read.

It is the second object of the present invention to provide a portable scanner which can be easily aligned with an object to be read and can reliably and accurately read the object to be read, when the object to be read is read while bringing the scanner main body close to or into contact with the object to be read.

It is the third object of the present invention to provide a portable scanner which can reliably read an object to be read even when the scanner main body is either brought into contact with the object to be read or separated therefrom.

In order to achieve the first object, according to the present invention, an optical opening which allows a light beam to pass therethrough is formed on the distal end portion of a scanner main body, light detection means for detecting a light beam incident via the optical opening is arranged in the scanner main body, and an optical notch portion for widening at least the incident width of the light beam to the light detection means to be larger than the width of the distal end portion of the scanner main body is formed on the distal end portion of the scanner main body.

In order to achieve the second object, according to the present invention, an optical opening which allows a light beam to pass therethrough is formed on the distal end portion of a scanner main body, light detection means for detecting a light beam incident via the optical opening is arranged in the scanner main body, and a guide member projects on the lower edge portion of the optical opening in a direction opposite to the direction of incidence of a reflected light beam.

In order to achieve the third object, according to the present invention, an optical opening which allows a light beam to pass therethrough is formed on the distal end portion of a scanner main body, a laser light source, light irradiation means for outputting a laser beam from the optical opening by periodically oscillating the laser beam emitted from the laser light source, and light-receiving means for receiving the laser beam reflected by an object to be read are arranged in the scanner main body, a shortest reading position is defined in the vicinity of the optical opening, and the light-receiving means has a resolution capable of reading an object to be read having a width smaller than the irradiation width of the laser beam at the shortest reading position.

According to the present invention, the optical opening, the optical notch portion, and an optical exit opening include a transparent window, a filter which transmits only a specific light beam, and the like in addition to holes, notches, and the like formed on the scanner main body. The object to be read includes characters, numerals, symbols, figures, and the like in addition to barcodes. The light source includes natural light, infrared rays, and the like in addition to light emitted from a light source such as a laser light source, lamp, LED, or the like. The light detection means and the light-receiving means include any one of or a combination of a solid-state image pickup element such as a CCD, a phototransistor, a photodiode, and the like.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 2A and 2B are respectively a plan view and a side view of the arrangement of the portable scanner shown in FIG. 1;

FIGS. 8A and 8B show an example of a scanning mirror shown in FIGS. 6A and 6B, in which FIG. 8A is a schematic view showing the arrangement of the scanning mirror, and FIG. 8B is a waveform chart of a driving pulse;

FIGS. 28A to 28C show modifications of the shape of the distal end portion of the scanner main body, in which FIG. 28A is a side view showing principal part of the distal end portion on an upper portion of which a convex curved surface is formed as a flank, FIG. 28B is a side view showing principal part of the distal end portion from which a guide projecting portion is removed, and FIG. 28C is a side view showing principal part of the distal end portion which is formed into a tapered shape.

DETAILED DESCRIPTION OF THE PREFERRED EMBODIMENTS

An embodiment of a portable scanner according to the present invention will be described below with reference to FIGS. 1 to 2B.

The portable scanner of this embodiment is a hand scanner with a structure, which comprises a plurality of LEDs (light sources) 2 for generating light beams, and a solid-state image pickup element (light detection means) 4 for detecting light beams reflected by a barcode (object to be read) 3 in its scanner main body 1.

Figure 1:
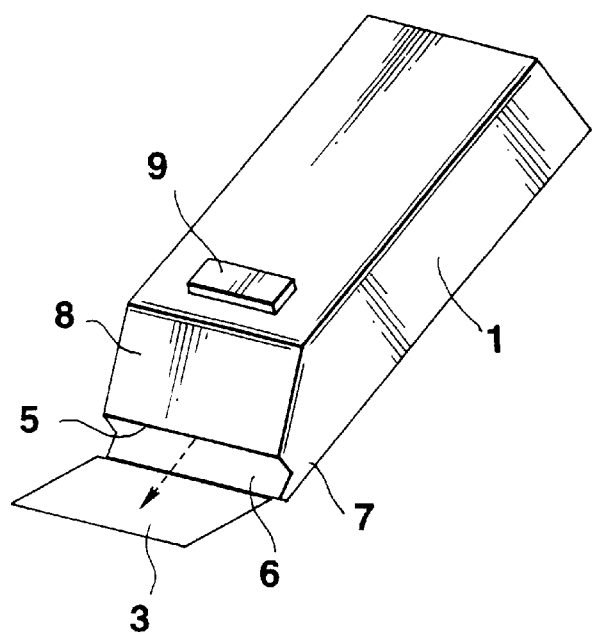
FIG. 1 is a perspective view showing the outer appearance of a portable scanner according to the present invention.

The scanner main body 1 is formed to have an almost straightly elongated box shape as a whole, as shown in FIG. 1. A rectangular exit opening (optical exit opening) 5 with an opening width K1 (FIG. 2A) is formed on the distal end portion of the scanner main body 1. A gap portion (optical notch portion) 6 defined by removing the upper portion and two side walls of the distal end portion is formed at the distal end portion, in front of the exit opening 5 (in the exit direction of the light beams), of the distal end portion of the scanner main body 1, so as to increase the irradiation width of the light beams from all the LEDs 2. With this structure, a guide projecting portion (guide member) 7 is formed on the lower edge portion (on the upper right portion in FIG. 2B) to project in the exit direction of the light beams. Furthermore, a flank 8 is formed near the exit opening 5 on the scanner main body 1 and is tilted from the upper portion (the upper left end portion in FIG. 2B) of the exit opening 5 to the upper surface (the left surface in FIG. 2B) of the scanner main body 1. With this structure, the distal end portion of the scanner main body 1 is tapered in the vertical direction. Note that an operation button 9 as a trigger switch is arranged on the upper surface of the scanner main body 1.

The plurality of LEDs 2 as light sources are arranged at predetermined intervals on the upper edge portion in the exit opening 5 of the scanner main body 1, so that the LEDs 2 at the right and left ends are located at the two ends of the exit opening 5. Note that each LED 2 externally emits a light beam having a wavelength of, e.g., 635 to 695 nm via the exit opening 5. The solid-state image pickup element 4 comprises, e.g., a CCD, and is placed on a mount base 10 arranged on the inner bottom surface in the scanner main body 1 to oppose the exit opening 5. The solid-state image pickup element 4 receives light beams emitted from the LEDs 2 and reflected by the barcode 3, thereby reading the barcode 3 as image data. In this case, by appropriately selecting the luminance of the LEDs 2 and the resolution of the solid-state image pickup element 4, a readable distance L from the distal end portion of the scanner main body 1 to the barcode 3 is set to be as large as several cm to several tens cm.

When the portable scanner with the above-mentioned structure reads a barcode 3 having a width larger than that of the distal end portion of the scanner main body 1, the barcode 3 can be read by separating the distal end portion of the scanner main body 1 by the predetermined distance L. On the other hand, when the portable scanner reads a barcode 3 having a width smaller or slightly larger than that of the distal end portion of the scanner main body 1, the barcode 3 can be read while the distal end portion of the scanner main body 1 is brought close to or into contact with the barcode 3. Therefore, by separating the scanner main body 1 from the barcode 3 by the predetermined distance L in correspondence with the size of the barcode 3, both a barcode 3 having a width larger than the width of the distal end portion of the scanner main body 1 and a barcode 3 having a width slightly larger than that of the distal end portion can be accurately read.

In the portable scanner of this embodiment, since the gap portion 6 is formed on the distal end portion of the scanner main body 1 by removing the upper portion and the two side walls of the distal end portion, the light beams emitted from the LEDs 2 via the exit opening 5 of the scanner main body spread to the right and left sides of the scanner main body 1. Thus, the irradiation width W of the light beams from the LED 2 with respect to the barcode 3 can be set to be larger than the width of the distal end portion of the scanner main body 1. For this reason, even when the barcode 3 is to be read while the distal end portion of the scanner main body 1 is brought close to or in contact with the barcode 3, a barcode 3 having a width larger than that of the distal end portion of the main body 1 can be reliably and satisfactorily read.

Furthermore, in this portable scanner, since the guide projecting portion 7 projects forward from the lower edge portion of the exit opening 5, the distance between the barcode 3 and the exit opening 5 can be controlled by bringing the distal end of the guide projecting portion 7 close to or into contact with the barcode 3, as shown in FIG. 2B. Thus, the scanner main body 1 can be easily aligned to the barcode 3, thus allowing a quick, accurate, and reliable reading operation. Since the flank 8 is formed, near the exit opening 5, on the upper portion of the scanner main body 1, the upper edge portion of the scanner main body 1 does not disturb the visual axis of a user in a reading operation, as shown in FIG. 2B, and the barcode 3 can be satisfactorily read while being visually observed.

Another embodiment of a portable scanner according to the present invention will be described below with reference to FIGS. 3 to 4B. Note that the same reference numerals in FIGS. 3 to 4B denote the same parts as in the embodiment shown in FIGS. 1 to 2B, and a detailed description thereof will be omitted.

Figure 3:
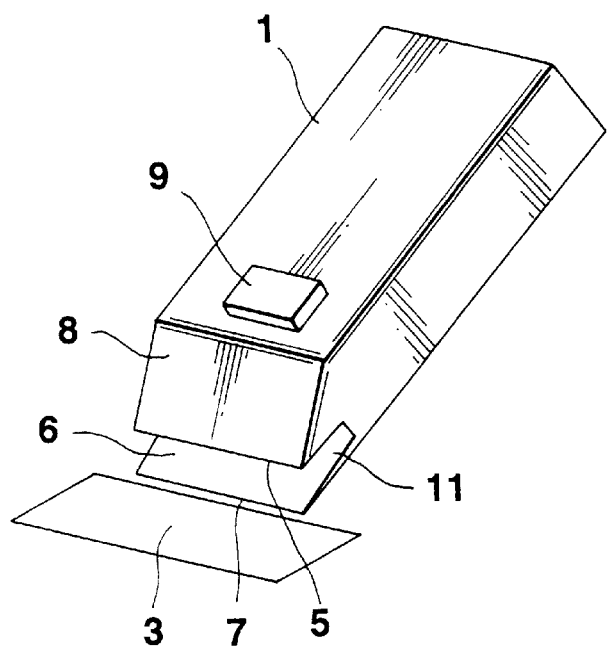
FIG. 3 is a perspective view showing the outer appearance of a portable scanner according to the present invention.
Figures 4A, 4B:
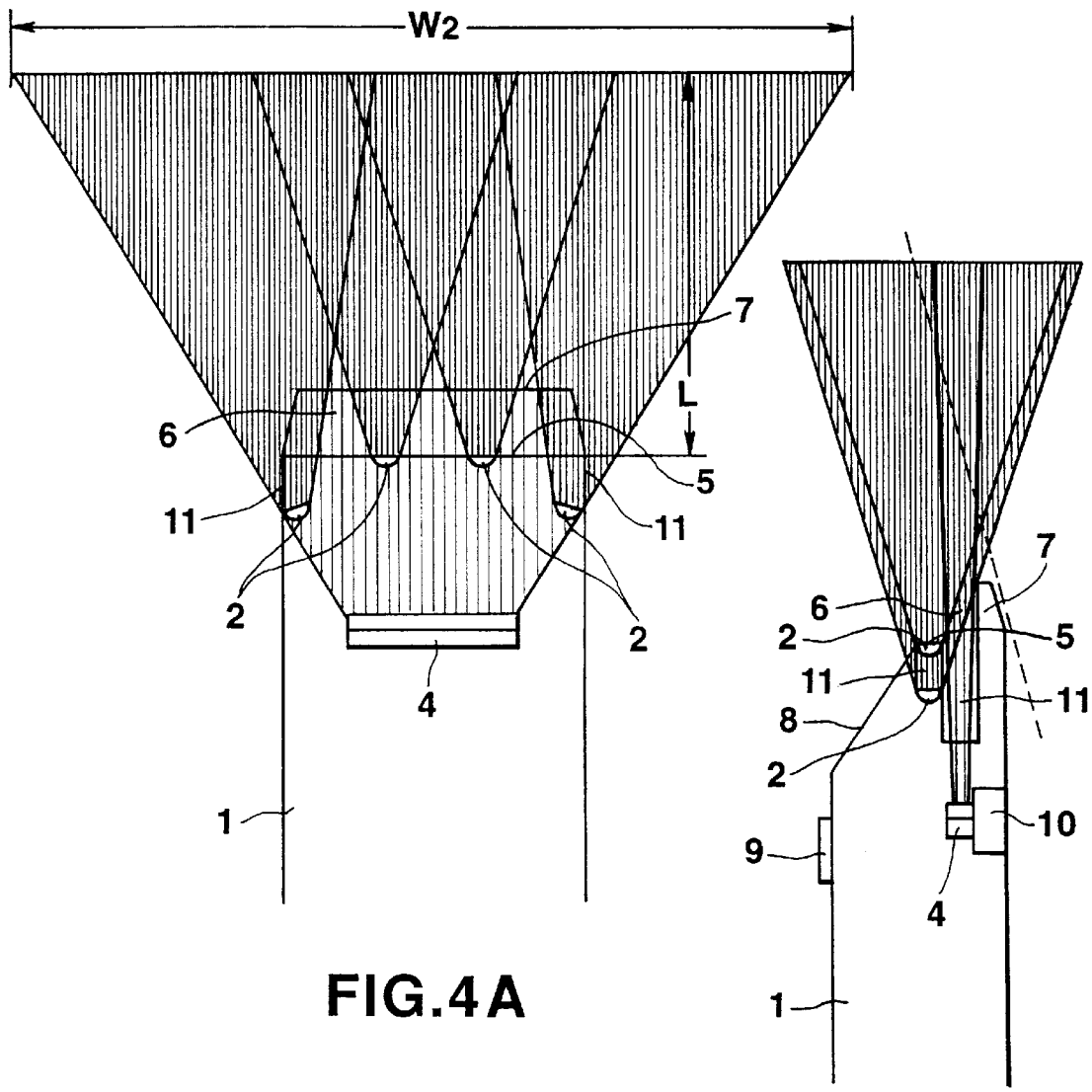
FIGS. 4A and 4B are respectively a plan view and a side view of the arrangement of the portable scanner shown in FIG. 3.

As shown in FIGS. 3 to 4B, the portable scanner of this embodiment has a structure in which notch portions 11 which allow the light beams from the LEDs 2 to pass therethrough are formed on the two side walls of the distal end portion of the scanner main body 1 provided with the exit opening 5 to extend toward a portion behind the exit opening 5 (in a direction opposite to the exit direction of the light beams), so as to obtain a larger irradiation width of light beams from the LEDs 2 with respect to the barcode 3 than that in the embodiment shown in FIGS. 1 to 2B. More specifically, the optical notch portion is defined by the gap portion 6 in front of the exit opening 5, and the notch portions 11 behind the exit opening 5. Of the plurality of LEDs 2, the LEDs 2 at the right and left end portions are arranged on the upper edge portion in the notch portions, and the remaining LEDs 2 are arranged on the upper edge portion in the exit opening 5, as shown in FIG. 4A.

As in the above embodiment, the portable scanner with the above-mentioned structure can accurately read a barcode 3 having a width larger than that of the distal end portion of the scanner main body 1 and a barcode 3 having a width slightly larger than that of the distal end portion by separating the scanner main body 1 from the barcode 3 by the predetermined distance L in correspondence with the size of the barcode 3. In particular, since the notch portions 11 which allow the light beams from the LEDs 2 to pass therethrough are formed on the two side walls of the distal end portion of the scanner main body 1 to extend toward a portion behind the exit opening 5, it can widen an irradiation width W2 of the light beams from the LEDs 2 to be larger than that in the above embodiment. For this reason, even when the barcode 3 is read by bringing the distal end portion of the scanner main body 1 close to or into contact with the barcode 3, the barcode 3 having a width larger than that of the above-mentioned embodiment can be read.

Note that the LEDs 2 are arranged as the light sources in the scanner main body in the above embodiments. However, the present invention is not limited to this, and a lamp may be used. In this case, a plurality of lamps may be arranged, but a single lamp may be arranged in the vicinity of the exit opening 5 in the scanner main body 1, and a reflector may be arranged behind the lamp, so that the light beam emitted from the lamp may be reflected by the reflector toward the exit opening 5.

In the above embodiments, the light sources such as the LEDs 2, lamps or the like are arranged in the scanner main body 1. However, if the solid-state image pickup element 4 has a high resolution, the light sources need not always be arranged in the scanner main body. In this case, the barcode 3 can be read as image data by receiving natural light reflected by the barcode 3 using the solid-state image pickup element 4 with the high resolution. In this case, in place of the exit opening 5 which is formed on the distal end portion of the scanner main body 1, and outputs light beams from the light sources such as the LEDs 2, lamp, or the like, a rectangular optical opening which receives external light beams such as natural light reflected by the barcode and has an opening width K1 may be arranged.

Still another embodiment of a portable scanner according to the present invention will be described below with reference to FIGS. 5 to 9. In this case as well, the same reference numerals in FIGS. 5 to 9 denote the same parts as in the embodiment shown in FIGS. 1 to 2B, and a detailed description thereof will be omitted.

The portable scanner of this embodiment is a laser scanner which comprises a laser optical unit 20 in the scanner main body 1.

The scanner main body 1 is formed to have an almost straightly elongated box shape as a whole, as shown in FIG.

5. A rectangular exit opening (optical exit opening) 21 with an opening width K1 (FIG. 6A) is formed on the distal end portion of the scanner main body 1. A gap portion (optical notch portion) 22 defined by removing the upper portion and two side walls of the distal end portion is formed at the distal end portion, in front of the exit opening 5 (in the exit direction of a light beam), of the distal end portion of the scanner main body 1. With this gap portion, a guide projecting portion (guide member) 23 is formed on the lower edge portion (the upper right portion in FIG. 6B) of the exit opening 21 to project in the exit direction of a laser beam. Furthermore, a flank 24, which is tilted from the upper portion (the left portion in FIG. 6B) of the exit opening 21 to the upper surface (the left surface in FIG. 6B) of the scanner main body 1 is formed near the exit opening 21 on the scanner main body 1. With this structure, the distal end portion of the scanner main body 1 is formed to have a tapered shape in the vertical direction. Note that an operation button 9 as a trigger switch is arranged on the upper surface of the scanner main body 1.

Figure 6A:
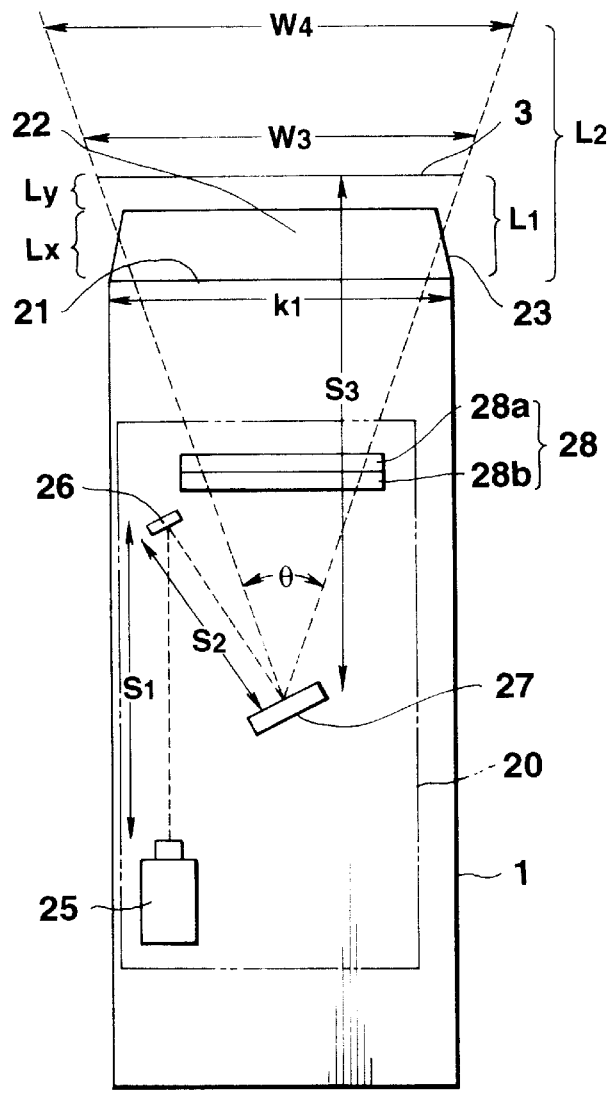
FIGS. 6A and 6B are respectively a plan view and a side view of the arrangement of the portable scanner shown in FIG. 5.
Figure 6B:
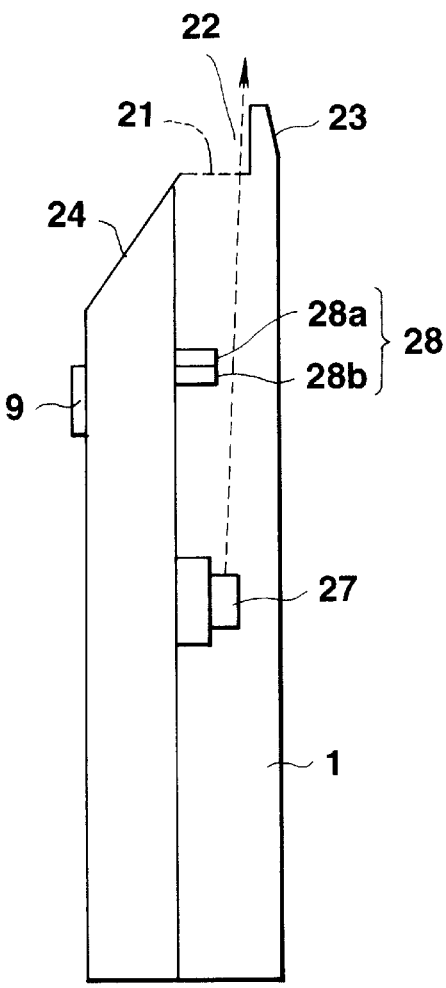

The laser optical unit 20 is constituted by a laser oscillator (laser light source) 25 for generating a laser beam, a reflection mirror 26 for reflecting the laser beam generated by the laser oscillator 25, a scanning mirror 27 for outputting the laser beam reflected by the reflection mirror 26 by periodically oscillating the laser beam, and a light-receiving unit 28 for receiving the laser beam reflected by the barcode 3, as shown in FIG. 6A. As shown in FIGS. 6A and 6B, the light-receiving unit 28 is constituted by a focusing lens 28a for focusing the laser beam reflected by the barcode 3, and a light-receiving element 28b which comprises a phototransistor, photodiode, or the like for receiving the light beam focused by the focusing lens 28a and converting the received light beam into an electrical signal. The light-receiving unit 28 is located in front of the scanning mirror 27, is formed to have a width slightly larger than that of an oscillation angle θ of the laser beam by the scanning mirror 27, and is arranged at a level position higher than the scanning mirror 27, so that the laser beam from the scanning mirror 27 passes below the light-receiving unit 28. In this case, the laser optical unit 20 is arranged in the scanner main body 1, so that a laser beam is output from the exit opening 21 along the bottom surface of the scanner main body 1.

Figure 8A:
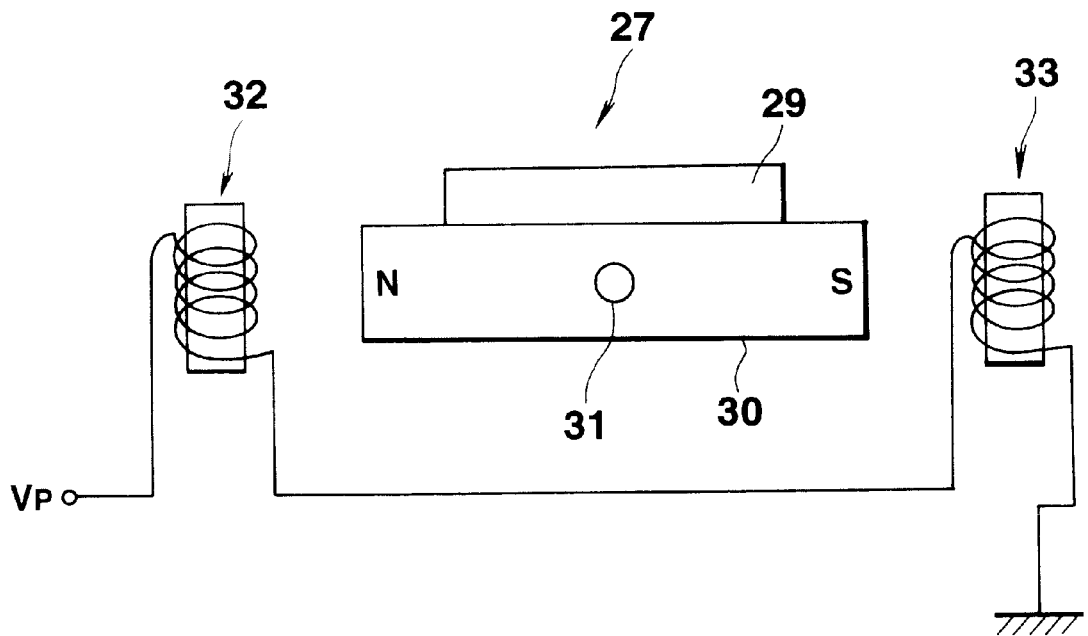
Figure 8B:
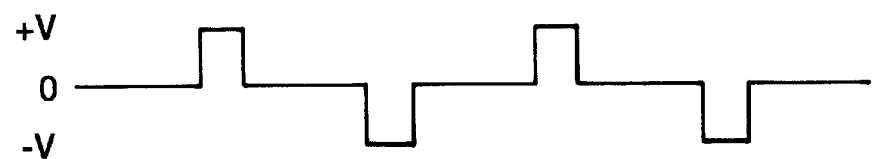

The distance from the scanning mirror 27 to a shortest reading position and the oscillation angle θ of the laser beam are set, so that a scanning width W3 of the laser beam by the scanning mirror 27 becomes substantially equal to or slightly larger than the width of the distal end portion (the guide projecting portion 23) of the scanner main body 1 in the vicinity of the distal end of the guide projecting portion 23. In this case, the scanning mirror 27 may comprise a polygonal mirror. However, in this embodiment, the scanning mirror 27 with a structure shown in FIGS. 8A and 8B is adopted. As shown in FIG. 8A, the scanning mirror 27 comprises a permanent magnet 30 attached to the rear side of a mirror plate 29. A rotating shaft 31 stands upright on the central portion of the permanent magnet 30, so that the mirror plate 29 and the permanent magnet 30 are swingable to the right and left about the rotating shaft 31. Coils 32 and 33 are arranged on the two sides of the permanent magnet 30. The coils 32 and 33 are connected in series with each other, and are applied with a driving pulse VP. The driving pulse VP has a waveform shown in FIG. 8B. More specifically, the driving pulse VP is a signal for alternately outputting positive and negative voltage signals. When the voltage pulse VP is applied to the coils 32 and 33, magnetic fields generated by the coils 32 and 33 drive the permanent magnet 30 to pivot it to the right and left about the rotating shaft 31. As a result, the permanent magnet 30 and the mirror plate 29 oscillate within the range of the oscillation angle θ to oscillate the laser beam. Note that the oscillation angle θ can be adjusted by controlling the application voltage and the time duration of the driving pulse VP. For example, when the oscillation angle θ is set to be large, the application voltage of the driving pulse VP can be increased, and its time duration can be prolonged.

In this laser optical unit 20, the shortest reading position is set in the vicinity of the exit opening 21, i.e., within a range from the outer vicinity to the inner vicinity of the exit opening 21, and the light-receiving unit 28 has a resolution which is high enough to read a barcode 3 with a width smaller than the scanning width W3 of the laser beam at the shortest reading position. The optical length from the laser oscillator 25 to the shortest reading position is set to be a length at which a predetermined resolution, i.e., a resolution having a predetermined ratio to a minimum resolution is obtained in the light-receiving unit 28. More specifically, an optical path length S0 from the laser oscillator 25 to the vicinity of the distal end of the guide projecting portion 23 (shortest reading position) corresponds to a sum total (S1+S2+S3) of a distance S1 from the laser oscillator 25 to the reflection mirror 26, a distance S2 from the reflection mirror 26 to the scanning mirror 27, and a distance S3 from the scanning mirror 27 to the vicinity of the distal end of the guide projecting portion 23, and a distance L1 from the exit opening 21 to the vicinity of the distal end of the guide projecting portion 23 corresponds to a sum (Lx+Ly=L1) of a projecting lens Lx of the guide projecting portion 23 of the exit opening 21, and a minimum closest distance Ly from the distal end of the guide projecting portion 23 to the barcode 3.

In this embodiment, the optical path length from the laser oscillator 25 to the shortest reading position of the barcode 3 is set to be 120 to 180 mm. In correspondence with this optical path length, for example, the distance S3 from the scanning mirror 27 to the shortest reading position is set to be about 90 mm, the distance L1 from the exit opening 21 to the shortest reading position is set to be about 20 mm, and the projecting length Lx of the guide projecting portion 23 of the scanner main body 1 is set to be about 10 mm. In addition, the opening width K1 of the exit opening 21 is set to be about 55 mm, the oscillation angle θ of the laser beam by the scanning mirror 27 is set to be about 40°, the scanning width W3 of the laser beam at the shortest reading position is set to be about 65 mm, the maximum width of the barcode 3, which can be read at the shortest distance position, is about 55 mm, and the resolution of the light-receiving unit 28 at this time is set to be 0.15 mm. More specifically, at the shortest reading position, the reading performance of this laser optical unit 20 corresponds to a level defined by the number of digits="13", the magnification=1.70, the barcode size=53.5 mm, the opening required for reading=63.5 mm, and the module size (resolution)=0.561 mm of a standard JAN of the Japanese Industrial Standards (JIS X 0501), and the light-receiving unit 28 has a resolution of 0.15 mm. For this reason, the portable scanner of this embodiment can read up to a barcode 3 which has a minimum width of 25 mm of a standard JAN, and of 18 mm of an abbreviated JAN at the shortest reading position (the resolution is 0.264 mm in both cases).

Figure 9:
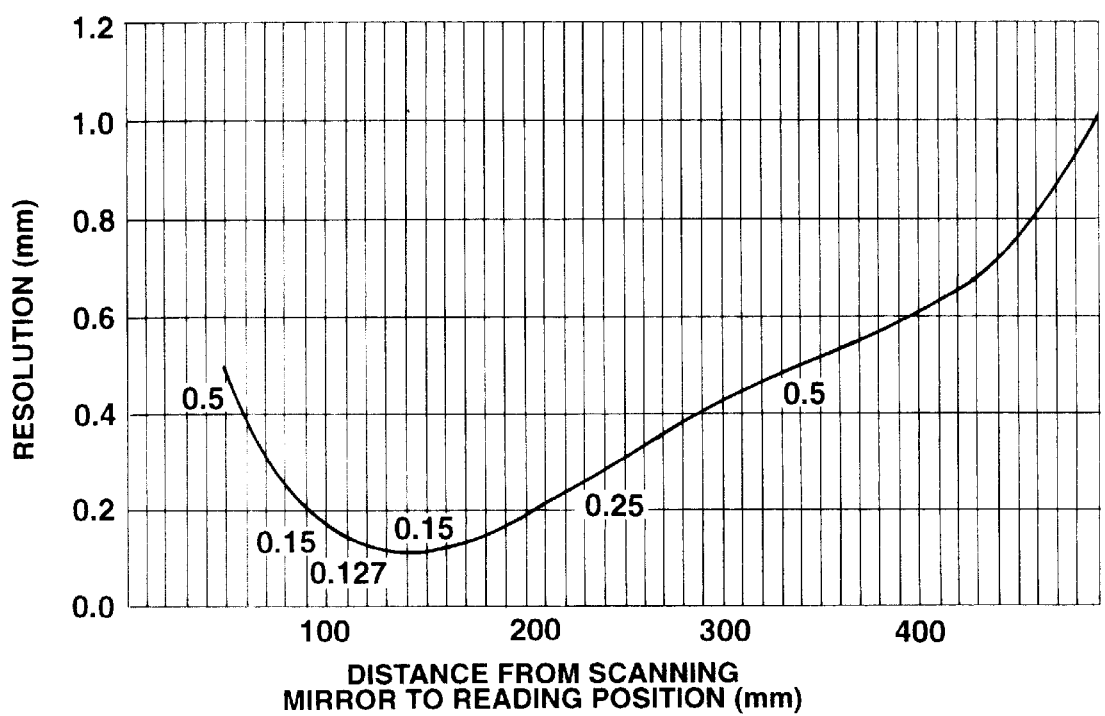
FIG. 9 is a graph showing the reading performance of a laser optical unit shown in FIGS. 6A and 6B.

The reading performance of the laser optical unit 20 is as shown in Table 1 below and FIG. 9.

TABLE 1

| Distance from scanning mirror to recording position (min) | Resolution of light-receiving unit (mm) | Reading width (mm) |
| --- | --- | --- |
| 50 | 0.5 | 36 |
| 90 | 0.15 | 65 |
| 110 | 0.127 | 80 |
| 150 | 0.15 | 109 |
| 240 | 0.25 | 174 |
| 340 | 0.5 | 247 |
| 490 | 1.0 | 356 |

More specifically, when the distance from the scanning mirror 27 to the reading position is 110 mm, the light-receiving unit 28 has a resolution of 0.127mm, i.e., a minimum resolution as a best one, and the reading width W3 at this time is 80 mm. When the distance from the scanning mirror 27 to the reading position becomes shorter than the above-mentioned distance, the resolution is gradually lowered. For example, when the distance to the reading position becomes 90 mm, the resolution is lowered to 0.15 mm; and when the distance becomes 50 mm, the resolution is lowered to 0.5 mm. On the other hand, when the distance from the scanning mirror 27 to the reading position increases, the resolution is gradually lowered, too. For example, when the distance becomes 150 mm, the resolution is lowered to 0.15 mm; when the distance becomes 240 mm, the resolution is lowered to 0.25 mm; when the distance becomes 340 mm, the resolution is lowered to 0.5 mm; and when the distance becomes 490 mm, the resolution is lowered to 1.0 mm. Note that the module size of the barcode 3 becomes larger as its width (size) becomes larger, and the resolution increases accordingly. For this reason, the laser optical unit 20 can read the barcode 3 when the distance from the scanning mirror 27 to the reading position falls within a range from 90 mm to 490 mm.

In the above-mentioned portable scanner, the optical path length S0 of the laser optical unit 20 is selected, so that the light-receiving unit 28 has a predetermined resolution (about 0.15 mm) when the shortest reading position of the laser optical unit 20 is set at a position close to the exit opening 21 of the scanner main body 1 (the distance from the scanning mirror 27 is 90 mm). For this reason, when the distance from the exit opening 21 of the scanner main body 1 to the barcode 3 is as small as about 20 mm, since the light-receiving unit 28 has a resolution of about 0.15 mm, a barcode defined by the Japanese Industrial Standards (JIS X 0501) can be accurately read. On the other hand, when the distance from the exit opening 21 of the scanner main body 1 to the barcode 3 is as large as about 420 mm, since the light-receiving unit 28 has a resolution of about 1.0 mm, a barcode defined by the Japanese Industrial Standards (JIS X 0501), and an ITF code defined by the U.S. Barcode Standards can be accurately read. For example, when a barcode having a size equal to or larger than that of the barcode 3 with the specific width W3, which is larger than the opening width K1 of the exit opening 21, is to be read, the exit opening 21 of the scanner main body 1 is separated by a predetermined distance L2 from the barcode in correspondence with the size of the barcode, and barcodes having a maximum size of about 356 mm can be easily and accurately read. When a barcode having a size equal to or smaller than that of the barcode 3 with the specific width W3 is to be read, the exit opening 21 of the scanner main body 1 is brought close to the barcode, and barcodes having a minimum size of about 18 mm can be accurately read.

In this portable scanner, since the gap portion 22 is formed at a position in front of the exit opening 21 by removing the upper portion and the two side walls of the distal end portion of the scanner main body 1, the gap portion 22 can widen the reading width W3 at the distal end of the scanner main body 1 to be larger than the width of the distal end portion of the scanner main body 1 as in the above embodiment. For this reason, a barcode 3 having a width substantially equal to or larger than that of the distal end portion can be read even in the vicinity of the distal end portion of the scanner main body 1. In this case, even when the oscillation angle θ of the scanning mirror 27 is set, so that the scanning width of the scanning mirror 27 becomes substantially equal to or slightly larger than that of the distal end portion of the scanner main body 1 (the width of the guide projecting portion 23), if the barcode 3 is read by bringing the distal end portion of the scanner main body close to or into contact with the barcode 3, the barcode 3 having a width substantially equal to or larger than that of the distal end portion of the scanner main body 1 can be read.

Figure 5:
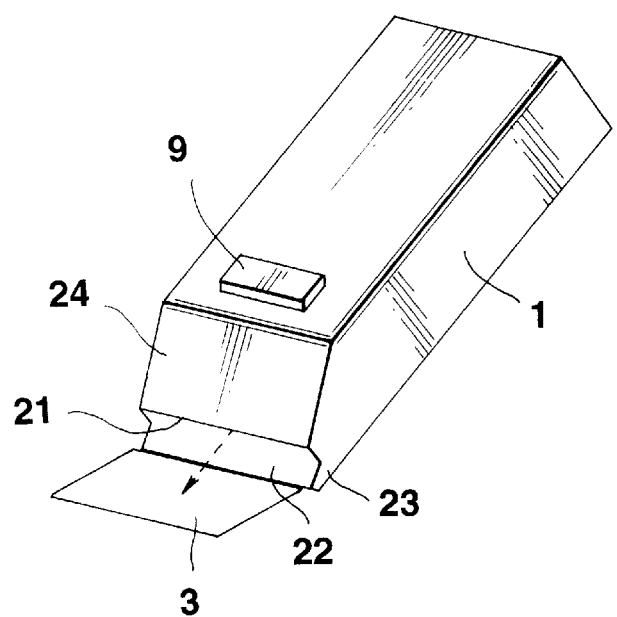
FIG. 5 is a perspective view showing the outer appearance of a portable scanner according to the present invention.
Figure 7:
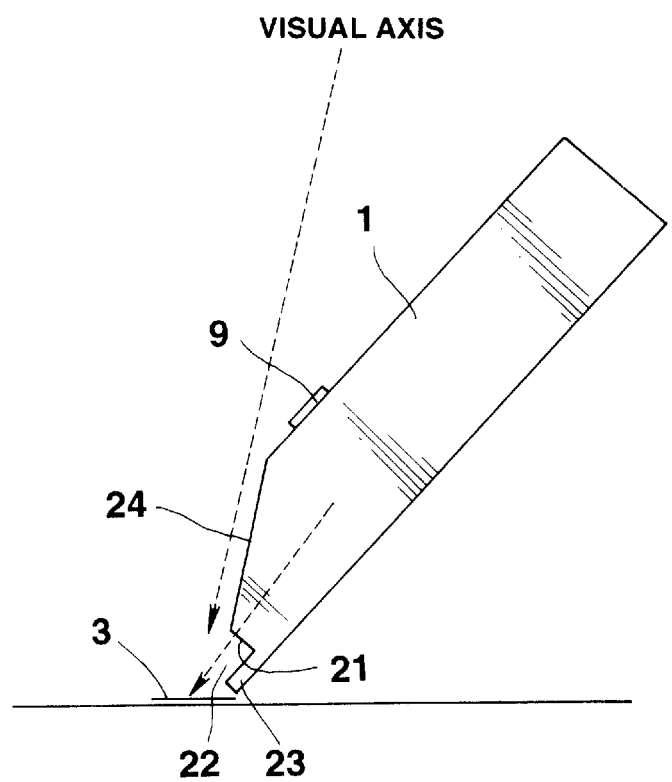
FIG. 7 is a side view showing the barcode reading state using the portable scanner shown in FIG. 5.

In this portable scanner, since the guide projecting portion 23 projects forward from the lower edge portion of the exit opening 21, as shown in FIGS. 5 and 7, the distance between the barcode 3 and the exit opening 21 can be controlled by bringing the distal end of the guide projecting portion 23 close to or into contact with the barcode 3, thus allowing easy alignment of the scanner main body 1 to the barcode 3. As a result, a quick, accurate, and reliable reading operation can be assured. Since the flank 24 is formed near the exit opening 21 on the upper portion of the scanner main body 1, the upper end portion of the scanner main body 1 does not disturb the visual axis of a user in the reading operation, as shown in FIG. 7, and a user can satisfactorily read the barcode 3 while visually observing it.

Furthermore, in this portable scanner, since the laser beam optical path of the laser oscillator 25, the reflection mirror 26, and the scanning mirror 27 passes below the light-receiving unit 28, so that the laser beam is output along the bottom surface of the scanner main body 1, the laser beam can be output in the vicinity of the bottom surface of the scanner main body 1, thus achieving a low-profile structure of the scanner main body 1. In addition, since the laser beam can be output in the vicinity of the bottom surface of the scanner main body 1, the laser beam can be easily aligned to the barcode 3, thus facilitating the reading operation. Since the laser optical unit 20 comprises the reflection mirror 26 for reflecting the laser beam generated by the laser oscillator 25 toward the scanning mirror 27, the laser optical unit 20 can be rendered compact, and the scanner can also be rendered compact as a whole.

Still another embodiment of a portable scanner according to the present invention will be described below with reference to FIGS. 10 to 11B. In this case as well, the same reference numerals in FIGS. 10 to 11B denote the same parts as in the embodiment shown in FIGS. 5 to 9, and a detailed description thereof will be omitted.

In this portable scanner, a guide member 40 is detachably attached to the distal end portion of the scanner main body 1 on the exit opening 21 side. The guide member 40 is constituted by a fitting portion 41 which detachably fits on the outer surface of the distal end of the scanner main body 1, and a guide portion 42 which is provided to the lower edge portion of the fitting portion 41, and projects forward by a larger amount than the guide projecting portion 23 of the scanner main body 1. In this case, the guide portion 42 has a larger projecting length than that of the guide projecting portion 23. With this structure, a distance L3 from the exit opening 21 to a barcode 43 in the vicinity of the distal end of the guide portion 42 becomes larger than the distance L1 in the above embodiment, and a scanning width W5 in the vicinity of the distal end of the guide portion 42 becomes larger than the scanning width W3 in the above embodiment.

Figure 10:
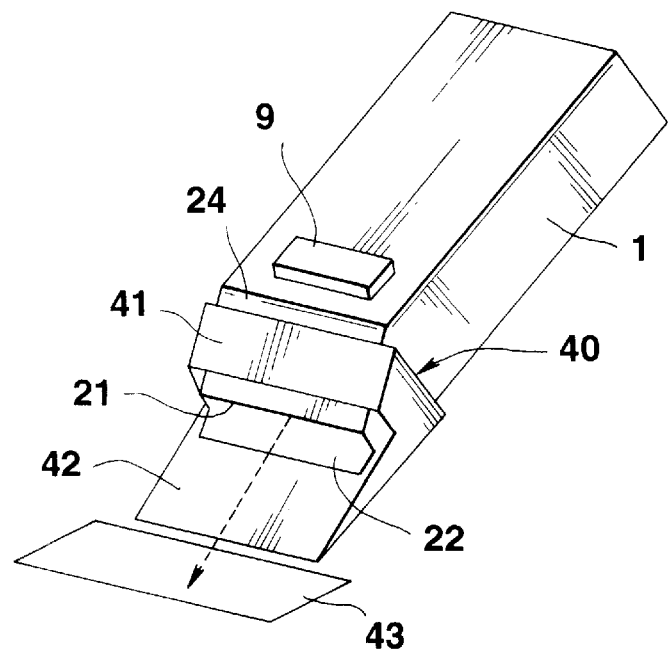
FIG. 10 is a perspective view showing the outer appearance of a portable scanner according to the present invention.
Figures 11A, 11B:
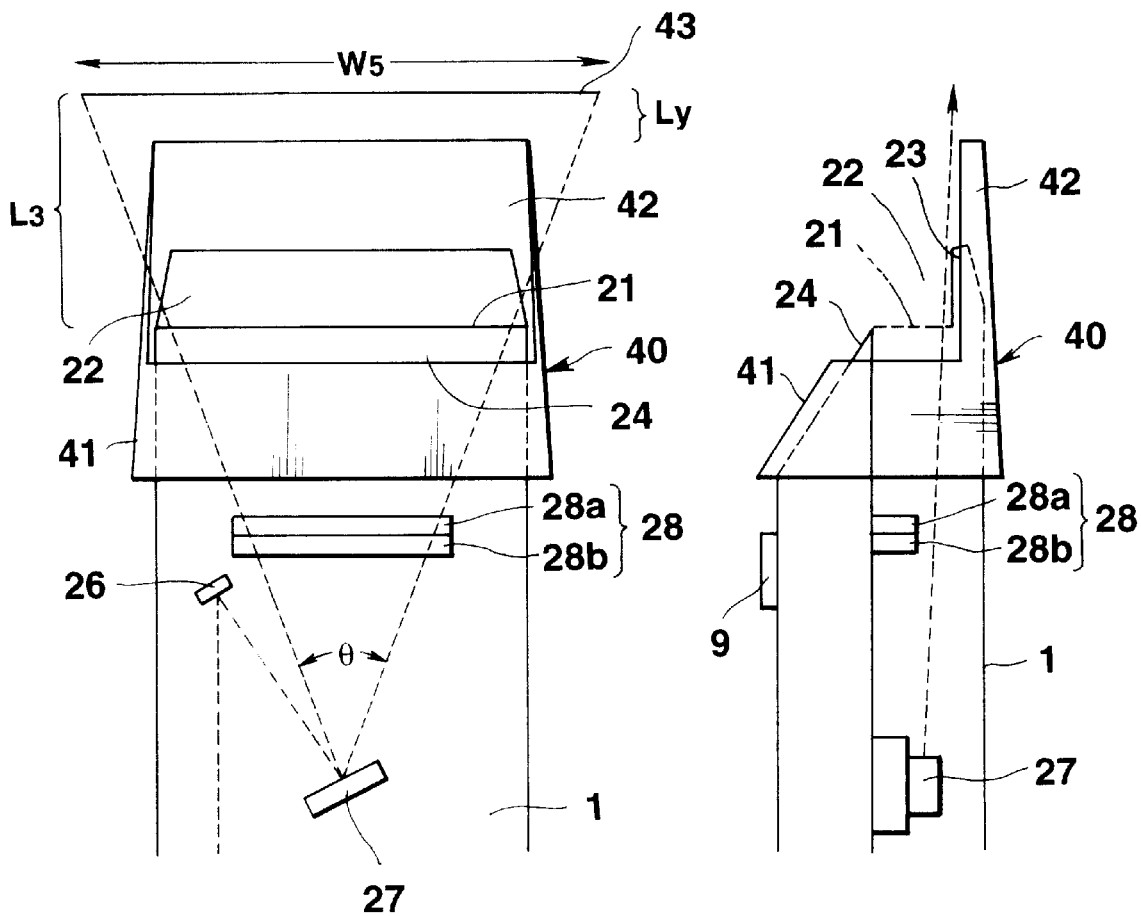
FIGS. 11A and 11B are respectively a plan view and a side view showing principal part of the arrangement of the portable scanner shown in FIG. 10.

In the portable scanner with the above-mentioned structure, as shown in FIG. 10, the guide portion 40 is attached to the distal end portion of the scanner main body 1 by fitting its fitting portion 41 thereon, and the distal end of the guide portion 42 of the guide member 40 is brought close to or into contact with the barcode 43 with the width W5 larger than that of the barcode 3 in the above embodiment. In this manner, even when the barcode 43 with the large width W5 is to be read, easy alignment is allowed, and the reading operation can be quickly performed. In addition, the barcode 43 with the large width W5 can be accurately and reliably read. When the guide member 40 is detached from the distal end portion of the scanner main body 1, the portable scanner of this embodiment can be used in the same manner as in the above embodiment.

Still another embodiment of a portable scanner according to the present invention will be described below with reference to FIGS. 12 to 14B. In this case as well, the same reference numerals in FIGS. 12 to 14B denote the same parts as in the embodiment shown in FIGS. 5 to 9, and a detailed description thereof will be omitted.

Figure 12:
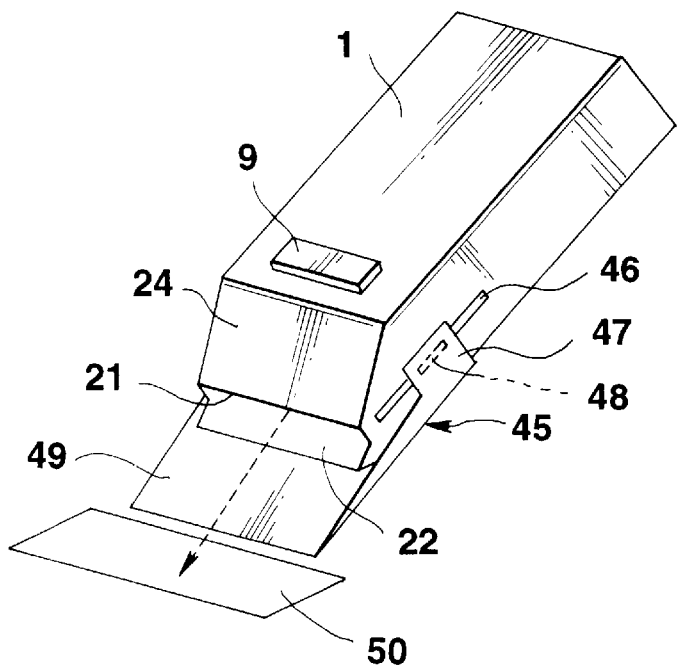
FIG. 12 is a perspective view showing the outer appearance of a portable scanner according to the present invention.
Figures 13A, 13B:
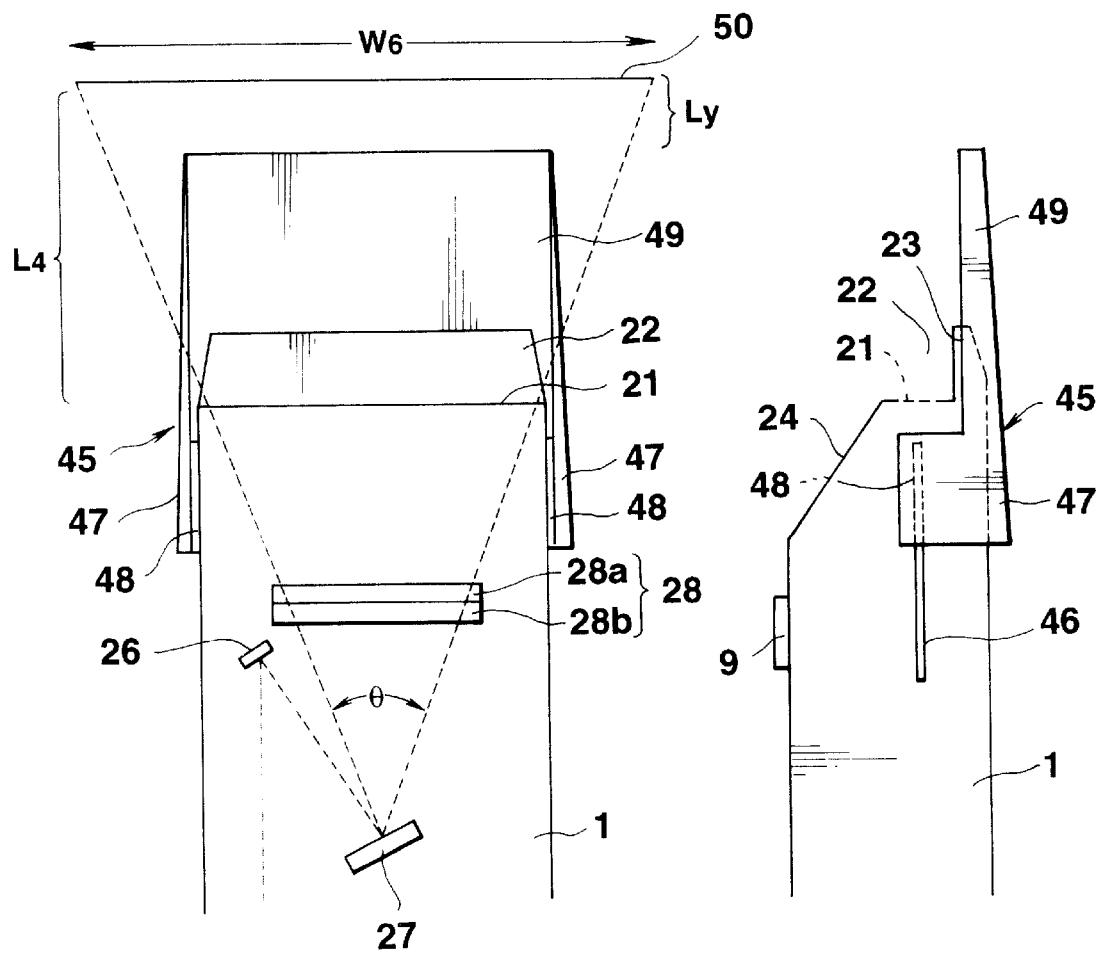
FIGS. 13A and 13B are respectively a plan view and a side view showing principal part in a barcode reading state at the maximum projecting length of a guide portion of the portable scanner shown in FIG. 11.
Figures 14A, 14B:
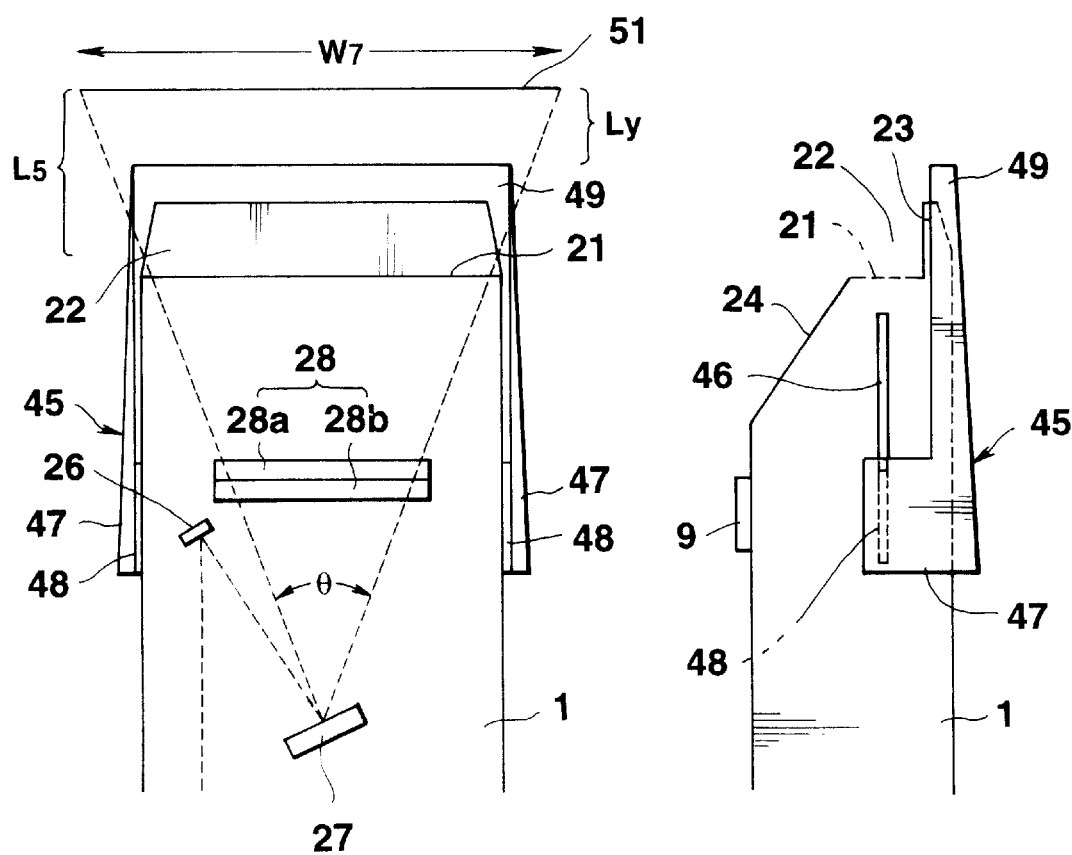
FIGS. 14A and 14B are respectively a plan view and a side view showing principal part in a barcode reading state at the minimum projecting length of a guide portion of the portable scanner shown in FIG. 11.

In this portable scanner, as shown in FIG. 12, a guide member 45 is attached to the outer side surfaces of the distal end portion of the scanner main body to be slidable in the exit direction of the laser beam. More specifically, guide attachment grooves 46 are formed on the two outer side surfaces of the distal end portion of the scanner main body 1 to extend parallel to the optical path of the laser beam. The guide member 45 is constituted by a clamping portion 47 which elastically clamps the two side surfaces of the scanner main body 1 and has a substantially U-shaped section, slide projections 48 which project from the opposing surfaces of the clamping portion 47 and are movably inserted in the guide attachment grooves 46, and a guide portion 49 which projects from the lower edge portion of the clamping portion 47 toward the exit direction of the laser beam. In this case, the maximum projecting length of the guide portion 49 is set, so that a distance L4 from the exit opening 21 to the reading position in the vicinity of the distal end of the guide portion 49 is larger than the distance L3 in the above embodiment, as shown in FIG. 13A, and the minimum projecting length of the guide portion 49 is set, so that a distance L5 from the exit opening 21 to the reading position in the vicinity of the distal end of the guide portion 49 is slightly larger than the distance L1 in the above embodiment, as shown in FIG. 14A.

In the portable scanner with the above arrangement, when the guide member 45 is slid relative to the scanner main body 1 to set the maximum projecting length of the guide portion 49, the distance L4 from the exit opening 21 to the reading position in the vicinity of the distal end of the guide portion 49 becomes larger than the distance L3 in the above embodiment. For this reason, even when the distal end of the guide portion 49 of the guide member 45 is brought into contact with a barcode, a barcode 50 with a width W6 larger than the width W5 of the barcode 43 in the above embodiment can be read. On the other hand, when the guide member 45 is slid relative to the scanner main body 1 to set the minimum projecting length of the guide portion 49, the distance L5 from the exit opening 21 to the reading position in the vicinity of the distal end of the guide portion 49 becomes slightly larger than the distance L1 in the above embodiment. For this reason, even when the distal end of the guide portion 49 of the guide member 45 is brought into contact with a barcode, a barcode 51 with a width W7 slightly larger than the width W3 of the barcode 3 in the above embodiment can be read. Therefore, when the projecting length of the guide portion 49 is adjusted in correspondence with the size of the barcode by sliding the guide member 45 relative to the scanner main body 1, arbitrary barcodes in a width range from W6 to W7 can be read in a contact state. In the reading operation, the scanner can be easily and satisfactorily aligned to such barcodes in a width range from W6 to W7.

Figure 15:
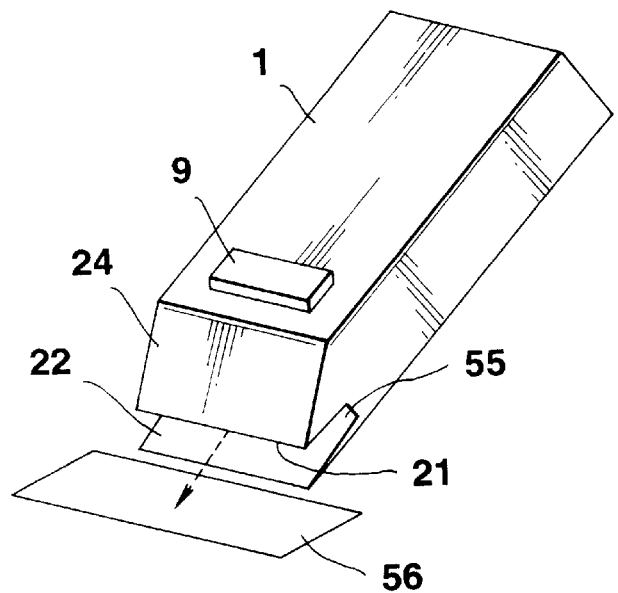
FIG. 15 is a perspective view showing the outer appearance of a portable scanner according to the present invention.
Figures 16A, 16B:
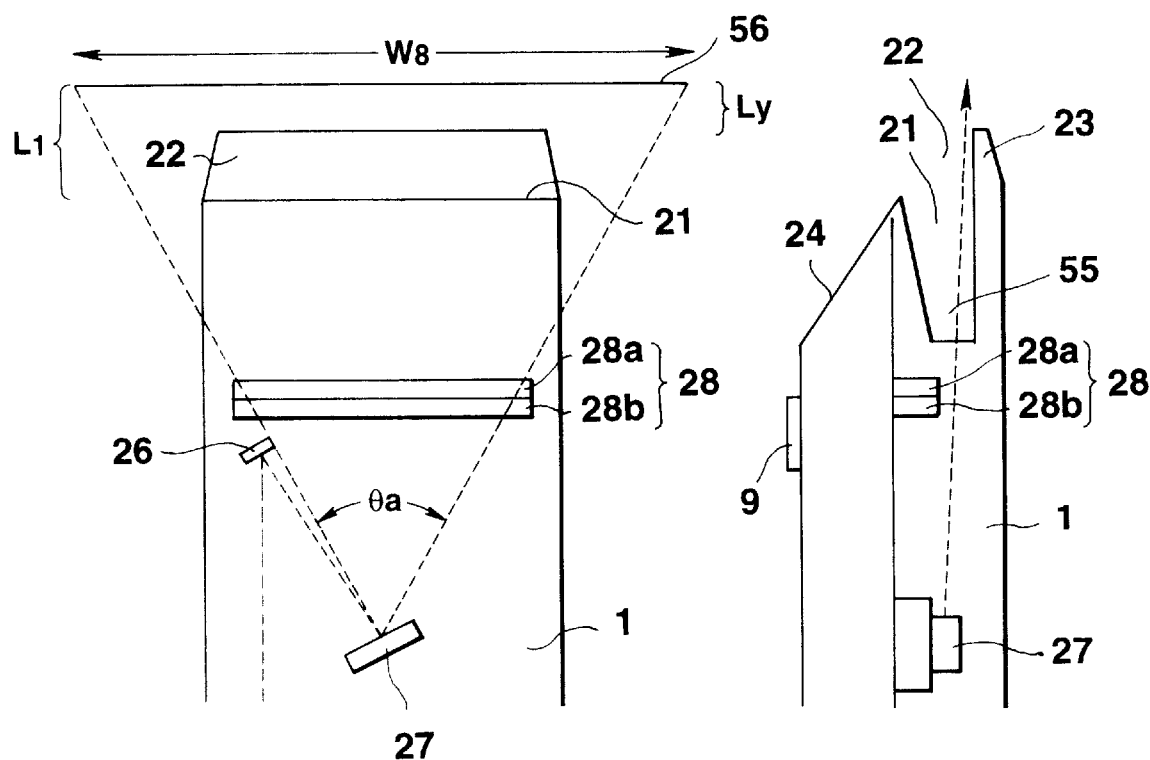
FIGS. 16A and 16B are respectively a plan view and a side view showing principal part in a barcode reading state near the distal end portion of the portable scanner shown in FIG. 15.

Still another embodiment of a portable scanner according to the present invention will be described below with reference to FIGS. 15 to 16B. In this case as well, the same reference numerals in FIGS. 15 to 16B denote the same parts as in the embodiment shown in FIGS. 5 to 9, and a detailed description thereof will be omitted.

The portable scanner of this embodiment has a structure in which notch portions 55 contiguous with the two ends of the exit opening 21 are respectively formed on the two side surfaces of the distal end portion of the scanner main body 1 provided with the exit opening 21, so that the oscillation angle of the laser beam by the scanning mirror 27 in the laser optical unit 20 is set to be θa larger than that in the above embodiment. In this case, the distance S0 from the laser oscillator 25 to the shortest reading position, and the distance L1 from the exit opening 21 to the shortest reading position L1 are set to be equal to those in the above embodiment (S0=S1+S2+S3 and L1=Lx +Ly). The light-receiving unit 28 is arranged at the same position as in the above embodiment, and is formed to have a larger width than that in the third embodiment since the oscillation angle θa of the laser beam is larger. Note that the oscillation angle θa of the laser beam falls within 60°.

In the portable scanner with the above arrangement, since the laser beam can also be output from the notch portions 55 formed on the two side surfaces of the scanner main body 1, the oscillation angle θa (>θ) of the laser beam by the scanning mirror 27 in the laser optical unit 20 can be set to be large. For this reason, even when the distal end portion of the scanner main body 1 is brought into contact with a barcode, a barcode 56 with a larger width W8 than that of the above embodiment can be read.

Figure 17:
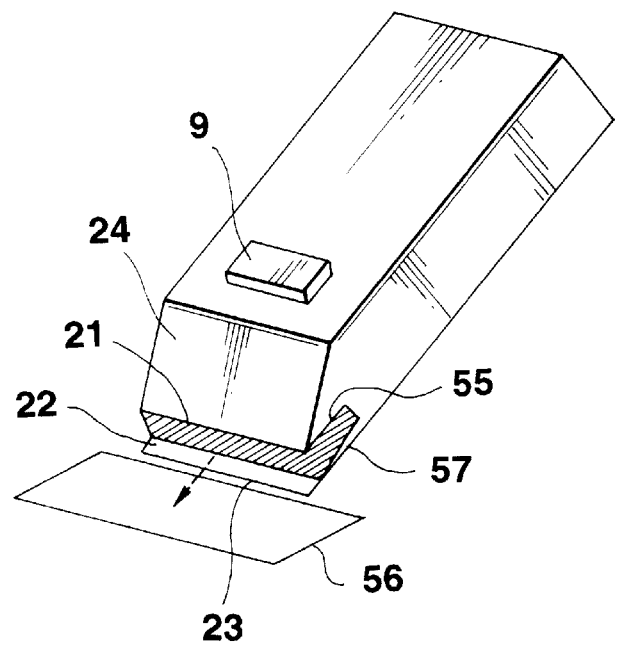
FIG. 17 is a plan view showing the outer appearance of a portable scanner according to the present invention.
Figures 18A, 18B:
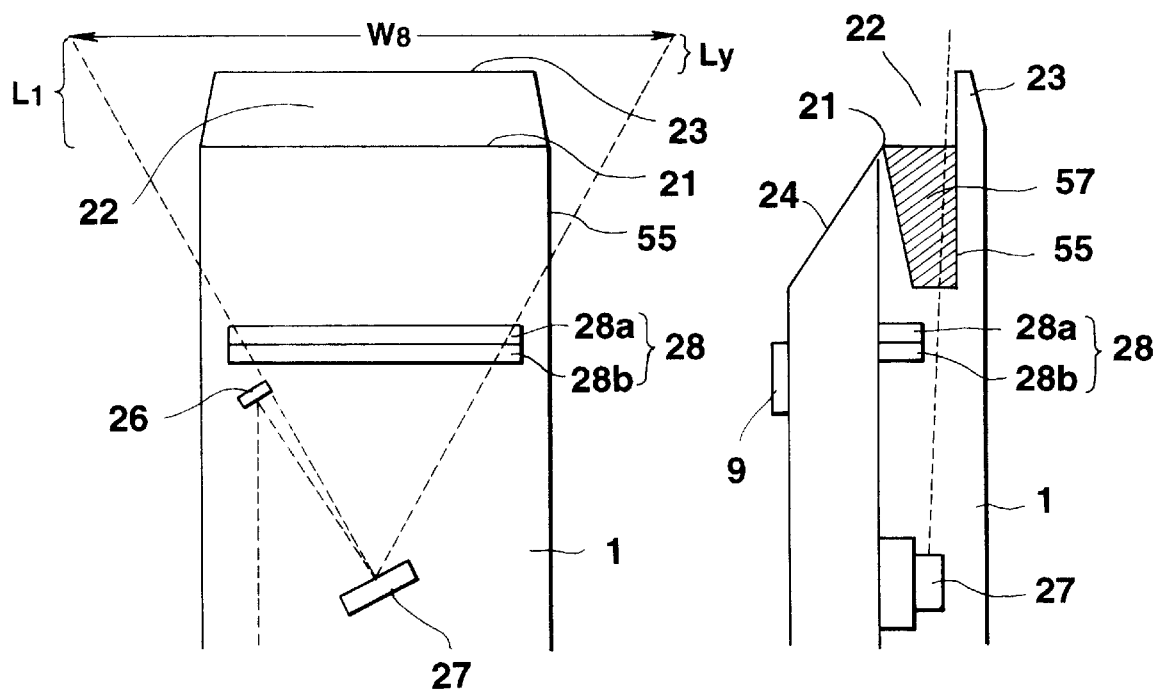
FIGS. 18A and 18B are respectively a plan view and a side view showing principal part in a barcode reading state near the distal end portion of the portable scanner shown in FIG. 17.

Still another embodiment of a portable scanner according to the present invention will be described below with reference to FIGS. 17 to 18B. In this case as well, the same reference numerals in FIGS. 17 to 18B denote the same parts as in the embodiment shown in FIGS. 5 to 9, and a detailed description thereof will be omitted.

The portable scanner of this embodiment has a structure in which the notch portions 55 contiguous with the two ends of the exit opening 21 are respectively formed on the two side surfaces of the distal end portion of the scanner main body 1 provided with the exit opening 21, and a filter 57 which transmits specific rays (e.g., rays having a wavelength of 650 nm or higher) therethrough is arranged to extend over the exit opening 21 and the notch portions 55, so that the oscillation angle of a laser beam (wavelength=670 nm) by the scanning mirror 27 in the laser optical unit 20 is set to be a large angle θa as in the above embodiment. In this case as well, the distance S0 from the laser oscillator 25 to the shortest reading position, and the distance L1 from the exit opening 21 to the shortest reading position L1 are set to be equal to those in the above embodiment (S0=S1+S2+S3 and L1=Lx+Ly).

In the portable scanner with the above arrangement, since the laser beam can also be output from the notch portions 55 formed on the two side surfaces of the scanner main body 1 as in the above embodiment, the oscillation angle θa (>θ) of the laser beam by the scanning mirror 27 in the laser optical unit 20 can be set to be large. For this reason, even when the distal end portion of the scanner main body 1 is brought into contact with a barcode, the barcode 56 with the larger width W8 than that of the above embodiment can be read. In addition, in particular, since the filter 57 is arranged to extend over the exit opening 21 and the notch portions 55, only specific ones of rays reflected by the barcode 56 can be fetched into the scanner main body 1. Therefore, the light-receiving precision of the light-receiving unit 28 can be improved, and a reading operation with very high accuracy can be assured.

Still another embodiment of a portable scanner according to the present invention will be described below with reference to FIGS. 19 to 25. In this case as well, the same reference numerals in FIGS. 19 to 25 denote the same parts as in the embodiment shown in FIGS. 5 to 9, and a detailed description thereof will be omitted.

Figure 19:
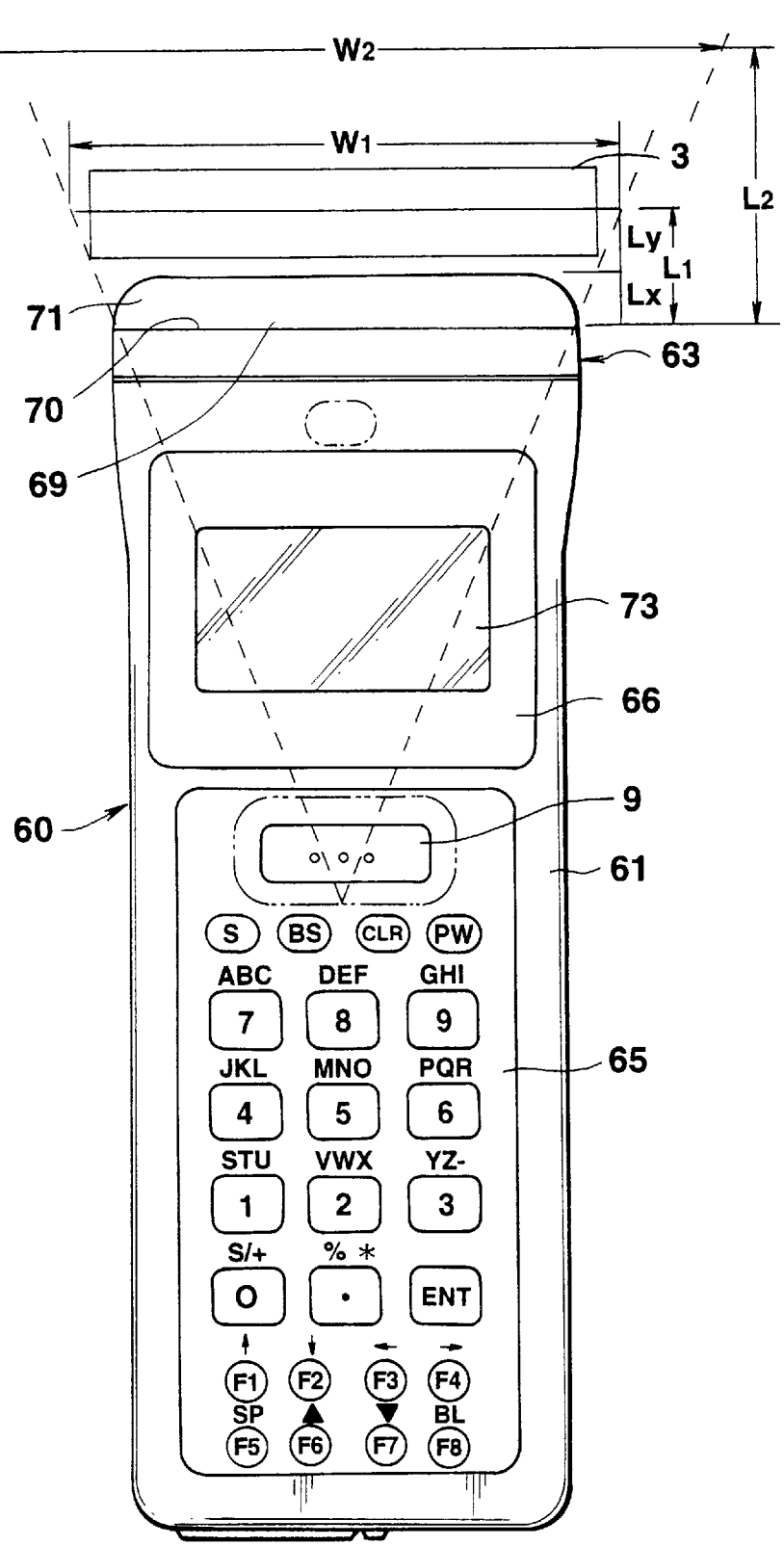
FIG. 19 is a plan view showing the outer appearance of a portable scanner according to the present invention.
Figure 20:
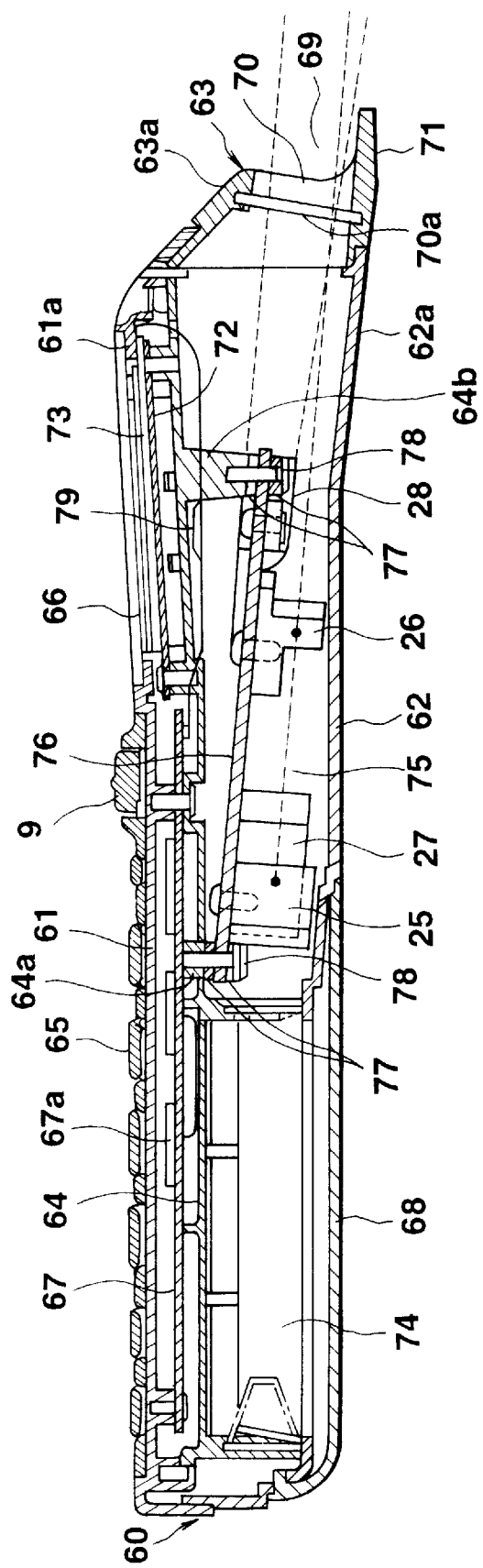
FIG. 20 is a sectional view of FIG. 19.

The portable scanner of this embodiment comprises a scanner main body 60 which is formed to have an almost straightly or linearly arranged elongated box shape as a whole, that is, an essentially rectangular parallelpiped configuration, as shown in FIG. 19. As shown in FIG. 20, the scanner main body 60 comprises upper and lower cases 61 and 62, a nose cap 63 is attached to the distal end portions (the right end portions in FIG. 20) of the upper and lower cases 61 and 62, and an inner case 64 is fixed by screws to the interior of the upper case 61.

As shown in FIG. 20, the rear portion side (the left portion side in FIG. 20) of the upper surface of the upper case 61 is formed to be a flat surface, and the distal end portion side of its upper surface is formed to be an inclined surface 61a, which is inclined obliquely upward. The distal end portion of the inclined surface 61a is bent obliquely downward in a substantially inverted-V shape. A key input unit 65 having various keys such as a ten-key pad, function keys, trigger keys, and the like are arranged on the flat surface, on the rear portion side, of the upper case 61, and a display window 66 consisting of a transparent plate such as an acrylic plate is arranged on the inclined surface 61a on the distal end portion side. A circuit board 67 which mounts electronic parts 67a such as LSIs is fixed by screws to a position, corresponding to the key input unit 65, on the inner surface of the upper case 61. The lower case 62 is formed to be an inclined portion 62a, the distal end side of the lower surface of which is slowly inclined downward, and a battery cover 68 is attached to the rear end portion side of the lower surface to be free to open/close.

A flank 63a is formed on the upper portion of the nose cap 63 and is inclined downward along the inclination of the distal end portion of the upper case 61. The lower portion of the nose cap 63 is slowly inclined downward along the inclination of the distal end side of the lower case 62. In this manner, the nose cap 63 is formed into a tapered rectangular cylindrical shape as a whole. An exit opening 70 for a laser beam is formed on the inner portion, on the distal end side, of the nose cap 63, and a filter 70a is arranged in the exit opening 70. A gap portion 69 is formed by removing the upper portion and two side portions of the distal end portion, in front of the exit opening 70, of the nose cap 63, and a guide projecting portion 71 projects from the lower portion of the distal end of the nose cap 63 in the exit direction of a laser beam.

A mount plate 72 is attached to the upper portion, on the distal end side, of the inner case 64 in correspondence with the display window 66, and a display panel 73 such as a liquid crystal display panel, an electroluminescence panel, or the like is arranged on the mount plate 72. In this case, the display panel 73 is attached to have a predetermined inclination angle, so that its distal end side (the right side in FIG. 20) is at a higher level. As for this inclination angle, the most easy-to-see angle for the visual axis of a user is 30°, and the inclination angle of the upper surface of the upper case 61 preferably falls within a range from 3° to 30°. In this embodiment, the inclination angle is set to be 3°. A battery accommodating portion 74 for accommodating a battery (not shown) is arranged on the rear end side of the lower portion of the inner case 64 in correspondence with the battery cover 68, and a laser optical unit 75 is attached at a substantially central position on the lower portion of the inner case 64, as will be described later.

Note that the circuit board 67 is electrically connected to the display panel 73 via a film board 79 for driving the panel, and is also electrically connected to the laser optical unit 75, the key input unit 65, and the battery via connection members (not shown) such as flexible boards, lead wires, and the like. The display panel 73 electrooptically displays barcode data read by the laser optical unit 75.

Figure 21:
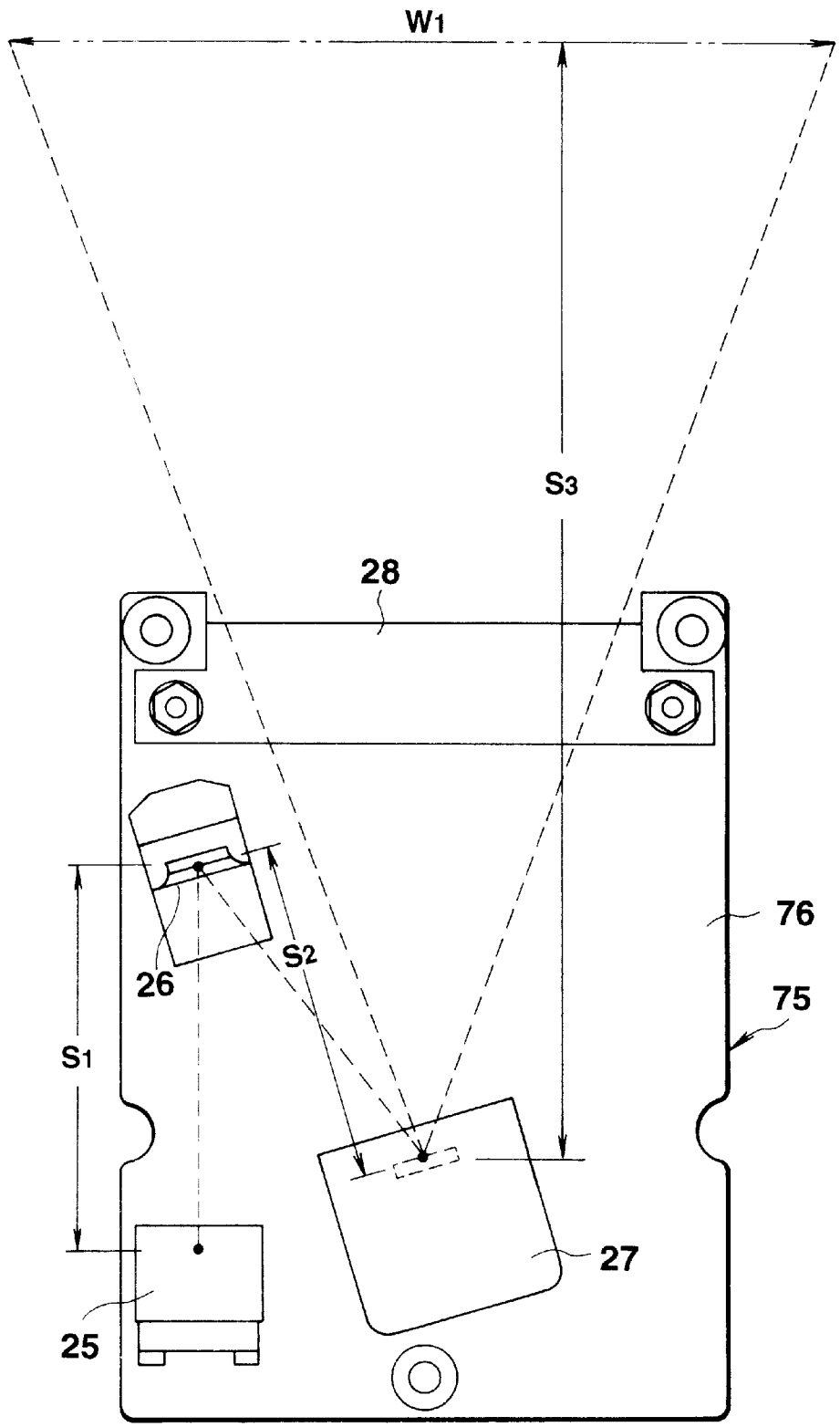
FIG. 21 is a plan view of a laser optical unit shown in FIG. 19.
Figure 22:
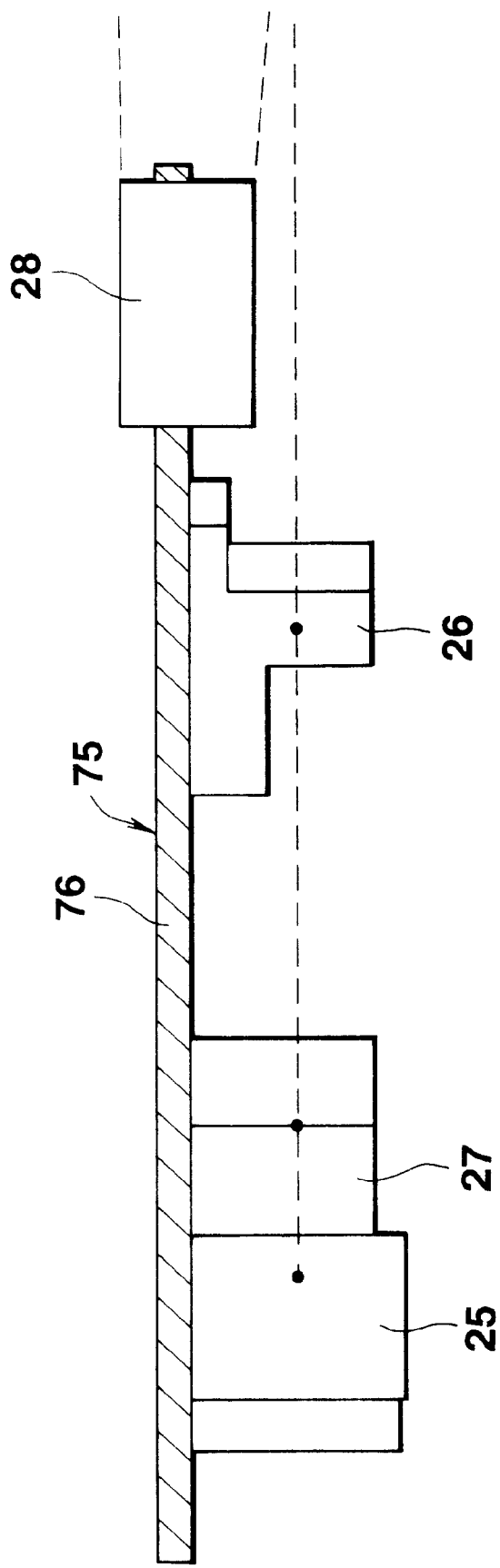
FIG. 22 is a side view of FIG. 21.

As shown in FIGS. 20 to 22, the laser optical unit 75 has a structure in which the laser oscillator 25, the reflection mirror 26, the scanning mirror 27, and the light-receiving unit 28 are attached to the lower surface of a unit board 76, and the unit board 76 is obliquely attached to oblique support bosses 64a and 64b on the inner case 64 by screws 78 via rubber bushings 77. More specifically, of the oblique support bosses 64a and 64b, the rear-side boss 64a is arranged on the upper surface of the inner case 64, and the distal end-side boss 64b is arranged on the lower surface of the inner case 64. When the unit board 76 is attached by the screws 78 to the lower end faces of these oblique support bosses 64a and 64b via the rubber bushings 77, the distal end of the unit board 76 is inclined downward at a predetermined angle in the longitudinal direction of the scanner main body 60, as shown in FIG. 20. In this manner, the optical path of the laser oscillator 25, the reflection mirror 26, the scanning mirror 27, and the light-receiving unit 28 is inclined downward at a predetermined angle to be parallel to the unit board 76, i.e., is inclined at an angle falling within a range from 2° to 30°, preferably, at an angle falling within a range from 2° to 15°, and most preferably, at an angle of about 5°. Note that the fine adjustment of the inclination angle of the optical path is attained by finely adjusting the inclination angle of the unit board 76 by adjusting the fastening state of the screws 78.

In this case, the bottom portion, on the distal end side, of the lower case 62 is bent along the optical path of the laser beam, so that the inclined portion 62a is inclined to be parallel to the laser beam. The unit board 76 is attached to the inner case 64 so that the laser beam propagates in a direction parallel to the inclined portion 62a of the lower case 62, and is closest thereto. As shown in FIG. 22, the light-receiving portion 28 is arranged at a level higher than that of the optical path of the laser beam, so that the laser beam output from the laser oscillator 25 toward the exit opening 70 passes below the light-receiving portion 28. Note that the filter 70a of the exit opening 70 is inclined at a predetermined angle, so that the laser beam is perpendicularly incident thereto.

In the laser optical unit 75, the optical path length of the laser beam from the laser oscillator 25 to the minimum reading position is set to be a length, at which the minimum reading position is located in the vicinity of the exit opening 70, i.e., falls within a range from the outer vicinity to the inner vicinity of the exit opening 70, and the light-receiving portion 28 has a predetermined resolution. More specifically, as shown in FIGS. 19 and 21, the optical path length S0 from the laser oscillator 25 to the vicinity of the distal end of the guide projecting portion 71, the distance S1 from the laser oscillator 25 to the reflection mirror 26, the distance S2 from the reflection mirror 26 to the scanning mirror 27, the distance S3 from the scanning mirror 27 to the guide projecting portion 71, the distance L1 from the exit opening 70 to the minimum reading position, the projecting length Lx of the guide projecting portion 71 of the exit opening 70, the minimum closest distance Ly from the distal end of the guide projecting portion 71 to the barcode 3, the resolution of the light-receiving portion 28, the oscillation angle θ of the scanning mirror 27, the reading width W1 of the barcode 3 at the minimum reading position, the distance L2 from the exit opening 70 to the maximum reading position, and the reading width W2 at the maximum reading position are set to be equal to those in the above embodiment.

A case will be explained below wherein such a laser scanner is used in practice.

Figure 23:
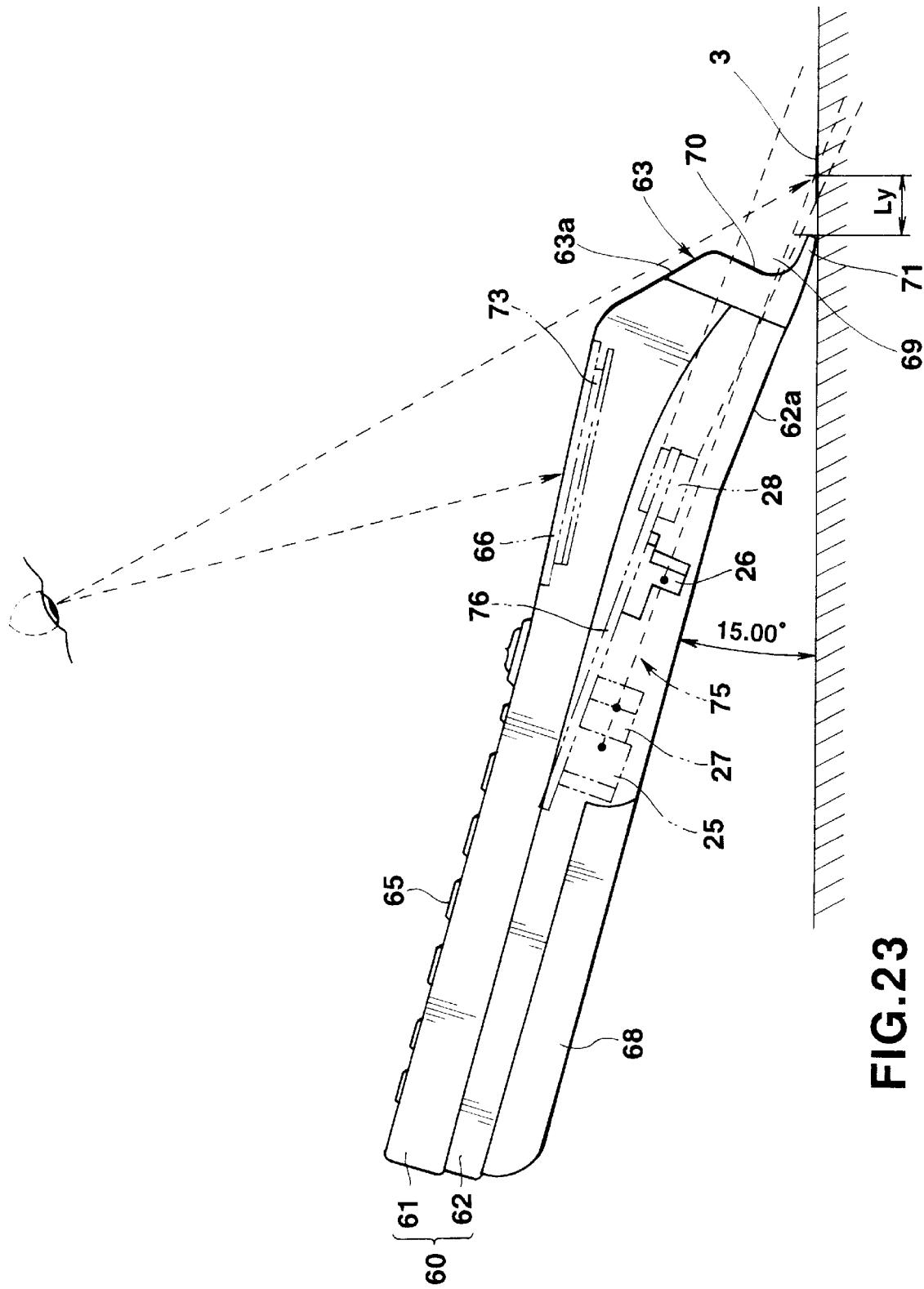
FIG. 23 is a side view showing the barcode reading state of the portable scanner shown in FIG. 20.
Figure 24:
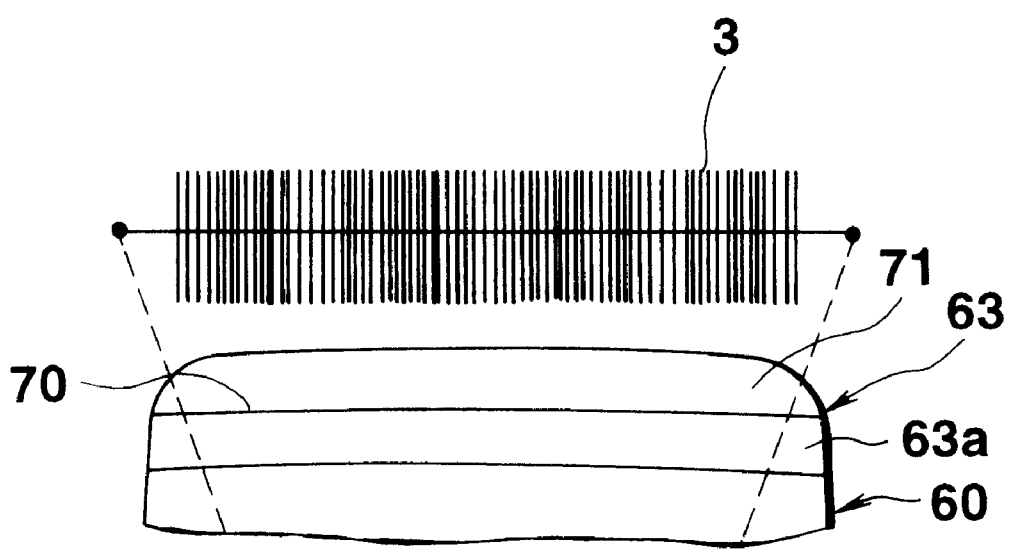
FIG. 24 is a plan view showing principal part of FIG. 23.

When a horizontally set barcode 3 is to be read by bringing the scanner main body 60 close to or into contact with the barcode 3, the scanner main body 60 is inclined at a predetermined angle (e.g., about 15°), so that its distal end side is low and the rear portion side is high, and the guide projecting portion 71 formed at the lower portion of the nose cap 63 of the scanner main body 60 is arranged in the vicinity of the barcode 3, as shown in FIGS. 23 and 24. At this time, since the laser beam is output from the exit opening 70 at a downward angle with respect to the longitudinal direction of the scanner main body 60, a user can naturally hold the scanner main body 60, and can aim the distal end portion of the scanner main body 60 at the barcode 3 with almost no movement of his or her wrist. Since the distal end side of the lower case 62 of the scanner main body 60 is formed to be the inclined portion 62a which extends parallel to the laser beam, a user can easily hold the scanner main body 60, and hence, can easily align the distal end portion of the scanner main body 60 to the barcode 3. In this state, the laser beam is irradiated onto the barcode 3, and the laser beam reflected by the barcode 3 is received by the light-receiving unit 28, thus reading the barcode 3. In this case, as shown in FIGS. 23 and 25, even when the scanner main body 60 is inclined at a predetermined angle, since the upper surface, on the distal end side, of the upper case 61 is formed to have an inverted-V shape, and the display panel 73 is obliquely arranged, so that its distal end side is inclined obliquely upward, a user can easily and satisfactorily observe the display panel 73 even during reading of the barcode 3, and can confirm whether or not the barcode 3 is read, by observing the display panel 73.

Figure 25:
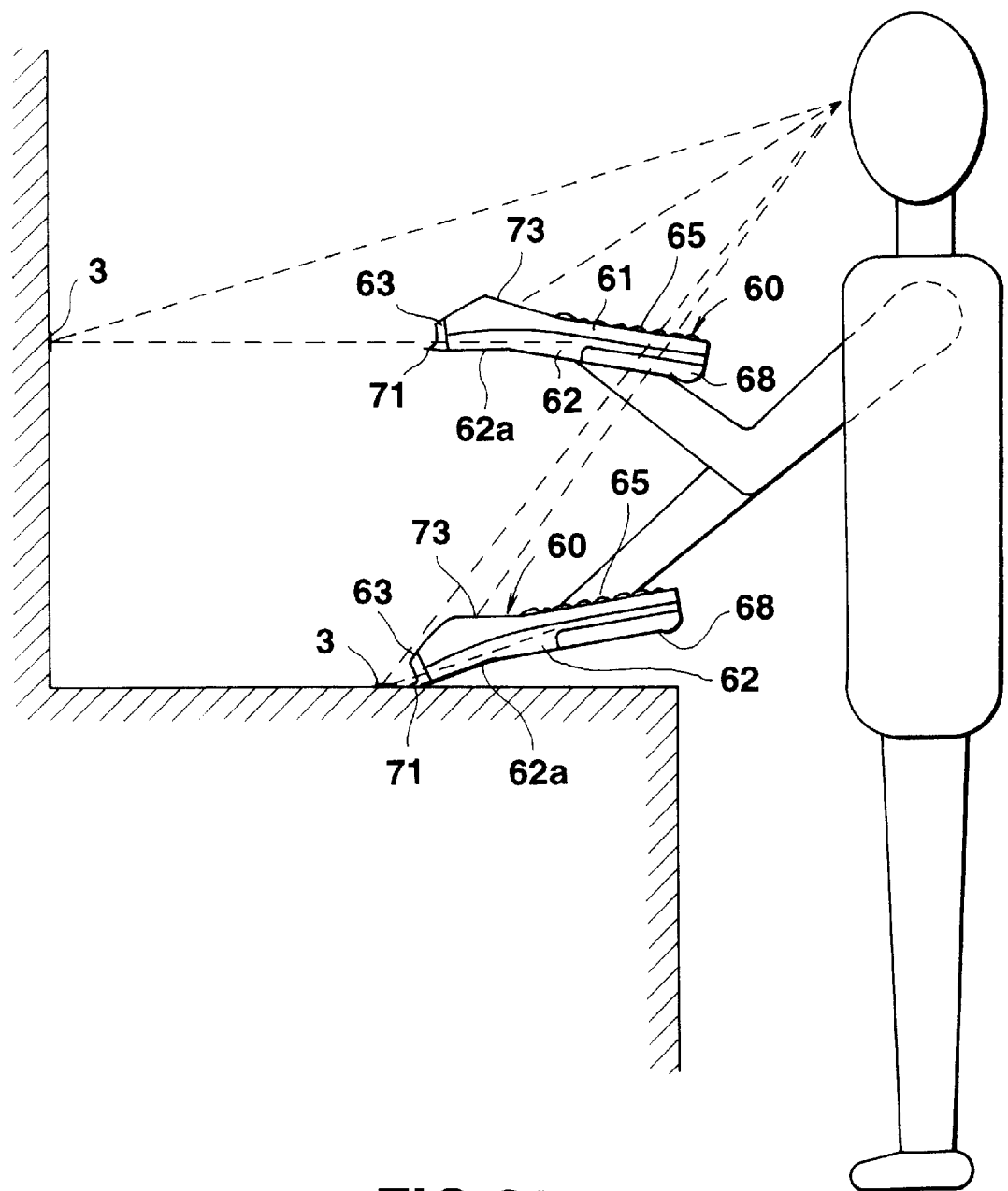
FIG. 25 is a side view showing an example of use of the portable scanner shown in FIG. 20.

When a barcode 3 on a vertical surface is to be read, the scanner main body 60 is held to be inclined obliquely upward, so that the distal end portion of the scanner main body 60 is directed to the barcode 3, as shown in FIG. 25. For example, as shown in FIG. 25, when the inclined portion 62a of the lower case 62 of the scanner main body 60 extends substantially horizontally, the scanner main body 60 is held to be inclined at a predetermined angle (e.g., a downward angle of the laser beam) with respect to a horizontal surface. At this time as well, since the laser beam is output from the exit opening 70 at the downward angle with respect to the longitudinal direction of the scanner main body 60, a user can naturally hold the scanner main body 60, and can aim the distal end portion of the scanner main body 60 at the barcode 3 with almost no movement of his or her wrist. In this state, the laser beam is output from the exit opening 70 of the nose cap 63 at a substantially right angle with respect to the barcode 3, and the laser beam reflected by the barcode 3 is received by the light-receiving unit 28, thereby reading the barcode 3. At this time as well, since the display panel 73 is inclined, so that its distal end side is inclined obliquely upward, a user can easily and satisfactorily observe the display panel 73 even during reading of the barcode 3, and can confirm whether or not the barcode 3 is read, by observing the display panel 73.

As described above, with this laser scanner, the optical path length of the laser beam from the laser oscillator 25 to the minimum reading position is set to be a length, at which the minimum reading position is located in the vicinity of the exit opening 70, i.e., falls within a range from the outer vicinity to the inner vicinity of the exit opening 70, and the light-receiving portion 28 has a predetermined resolution. For this reason, as in the above embodiment, the barcode 3 can be reliably read independently of the distance from the scanner main body 60. Even when the barcode 3 is read by bringing the scanner main body 60 into contact with the barcode 3, the scanner main body 60 can be easily aligned to the barcode 3 by controlling the distance between the barcode 3 and the exit opening 70 by bringing the distal end of the guide projecting portion 71 into contact with the barcode 3, thus allowing a quick, accurate, and reliable reading operation.

In this laser scanner, since the laser beam is output from the exit opening 70 at a downward angle with respect to the longitudinal direction of the scanner main body 60, a user can naturally hold the scanner main body 60, and can aim the distal end portion of the scanner main body 60 at the barcode 3 with almost no movement of his or her wrist. For this reason, the barcode 3 can be satisfactorily read, and the reading operability can be improved. In particular, since the distal end side of the lower case 62 of the scanner main body 60 is formed to be the inclined portion 62a, which extends parallel to the laser beam, a user can easily hold the scanner main body 60 when the barcode 3 is to be read by bringing the scanner main body 60 close to or into contact with the barcode 3, thus facilitating a reading operation very much, and further improving the reading operability. Since the flank 63a is formed on the upper portion of the nose cap 63 located near the exit opening 70, the distal end of the upper portion of the scanner main body does not disturb the visual axis of a user in a reading operation, and a user can read the barcode 3 while confirming it, as in the above embodiment.

Furthermore, in this laser scanner, since the laser oscillator 25, the reflection mirror 26, the scanning mirror 27, and the light-receiving unit 28 are mounted on the unit board 76 to constitute a unit, these members can be easily attached in the scanner main body, thus improving assembling operability. In addition, since the unit board 76 is attached to the scanner main body 60, so that the laser oscillator 25, the reflection mirror 26, the scanning mirror 27, and the light-receiving unit 28 are located on its lower surface side, the laser beam can be output along the bottom surface of the scanner main body 60, i.e., the inclined portion 62a of the lower case 62. For this reason, since the laser beam can be brought closest to the inclined portion 62a of the lower case 62, a low-profile structure of the scanner main body 60 can be realized. Since the laser optical unit 75 comprises the reflection mirror 26 for reflecting the laser beam generated by the laser oscillator 25 toward the scanning mirror 27, the laser optical unit 75 can be rendered compact, and hence, the entire scanner can be rendered compact as in the above embodiment.

In the above embodiment, the laser beam is output downward by obliquely arranging the unit board 76. However, the present invention is not limited to this. For example, the laser beam may be output downward, as shown in FIG. 26 or 27.

Figure 26:
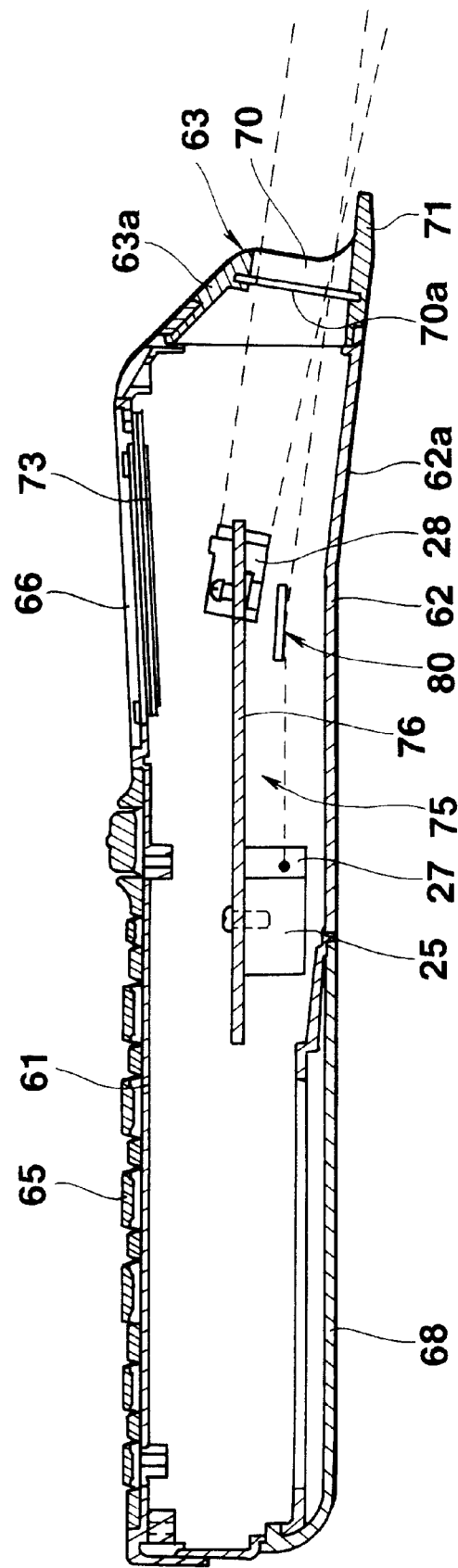
FIG. 26 is a partially cutaway sectional view of a portable scanner according to the present invention.

More specifically, in a portable scanner of the embodiment shown in FIG. 26, the unit board 76 is horizontally arranged in the scanner main body 60, and a total reflection mirror 80 is arranged in the vicinity of the lower side of the light-receiving unit 28 arranged on the lower surface of the unit board 76. A horizontal laser beam oscillated by the scanning mirror 27 is reflected by the total reflection mirror 80 to be inclined downward at a predetermined angle, i.e., at about 5° with respect to the longitudinal direction of the scanner main body 60, thereby outputting the laser beam from the exit opening 70 in a direction parallel to the inclined portion 62a of the lower case 62. In this case, as shown in FIG. 26, the light-receiving unit 28 is obliquely attached to the unit board 76, so that its light-receiving surface (the incident surface of a focusing lens group 28a) is set in a direction substantially perpendicular to the downward laser beam. The laser scanner of this embodiment with the above arrangement can also provide the same effects as in the above embodiment.

Figure 27:
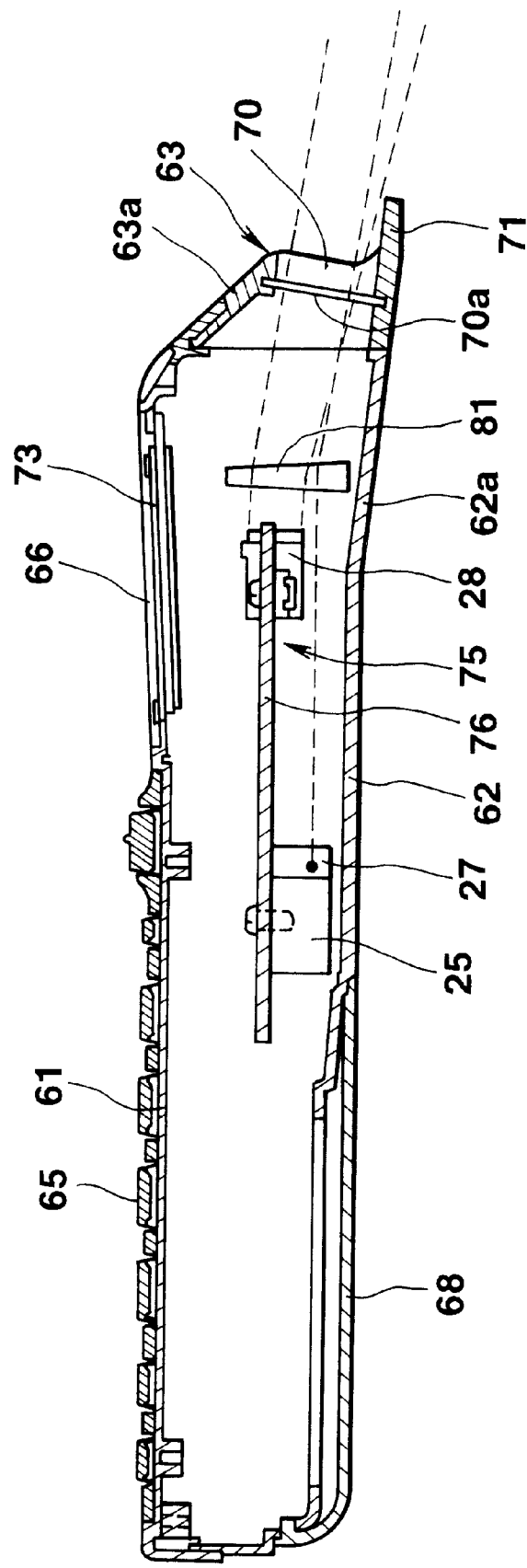
FIG. 27 is a partially cutaway sectional view of a portable scanner according to the present invention.

In a laser scanner of the embodiment shown in FIG. 27, the unit board 76 is horizontally arranged in the scanner main body 60, and a prism 81 is arranged in front of the light-receiving unit 28 arranged on the lower surface of the unit board 76. A horizontal laser beam oscillated by the scanning mirror 27 is deflected by the prism 81 to be inclined downward at a predetermined angle, i.e., at about 5° with respect to the longitudinal direction of the scanner main body 60, thereby outputting the laser beam from the exit opening 70 in a direction parallel to the inclined portion 62a of the lower case 62. On the other hand, the laser beam reflected by the barcode is deflected by the prism 81 in a substantially horizontal direction, and is received by the light-receiving unit 28. The laser scanner of this embodiment with the above arrangement can also provide the same effects as in the above embodiment.

The present invention is not limited to the above embodiments.

Figure 28A:
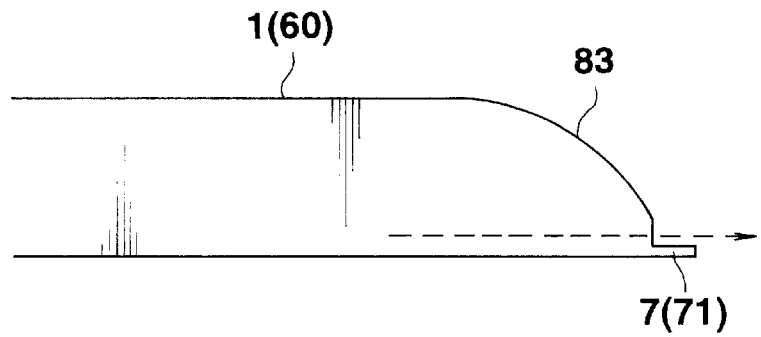

For example, in each of the above embodiments, the flank 8 (or 63a), which is inclined in a flat-surface shape, is formed on the upper surface of the distal end portion of the scanner main body 1 (or 60). However, the present invention is not limited to this. For example, a flank 83 may be formed by a convex curved surface, as shown in FIG. 28A.

Figure 28B:
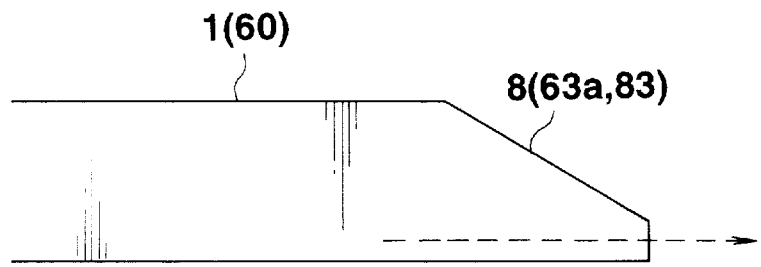

In each of the above embodiments, the guide projecting portion 7 (or 71) is formed at the lower portion of the distal end of the scanner main body 1 (or 60). However, the present invention is not limited to this. For example, as shown in FIG. 28B, the guide projecting portion 7 (or 71) need not always be formed. In this case, the distal end portion of the exit opening 21 (or 70) of the scanner main body 1 (or 60) is brought close to or into contact with a barcode, thus allowing a reading operation at a close distance.

Figure 28C:
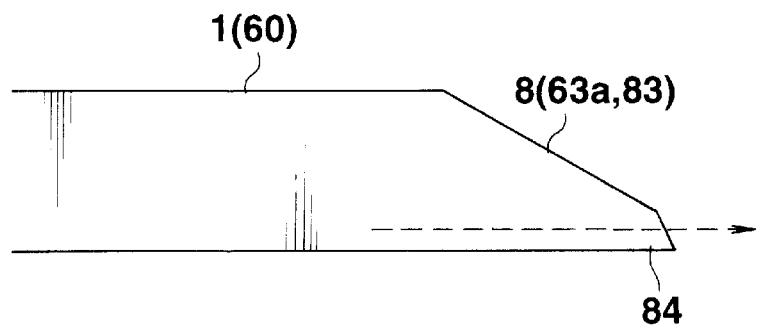

In each of the above embodiments, the distal end face of the distal end portion of the scanner main body 1 (or 60) is formed as a substantially vertical surface. However, the present invention is not limited to this. For example, as shown in FIG. 28C, a distal end portion 84 may be formed in a tapered shape, so that its lower end portion projects forward. With this structure, the guide projecting portion 7 (or 71) need not always be formed, and the lower portion of the distal end of the tapered distal end portion 84 can be used as a guide projecting portion.

Furthermore, in each of the above embodiments, a barcode is read by scanning the laser beam in one direction. However, the present invention is not limited to this. For example, a laser beam may be scanned in two directions, i.e., the vertical and horizontal directions, by a raster-scan method, so as to two-dimensionally read an object to be read.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable reading apparatus for scan-reading a code using a laser light beam, comprising:

a substantially flat, thin, elongated housing;

a laser light beam emission module arranged in a lower region of the housing which emits the laser light beam in a direction parallel to a flat bottom surface of the housing, thereby sending the laser light beam out in a substantially longitudinal direction with respect to the housing out of an opening which is provided in a lower region of a distal end portion of the housing;

a guide portion provided on a lower region of an edge of the opening which guides the edge of the opening; and a light detection unit arranged inside the housing which reads the code recorded on a code reading surface by detecting a laser light beam which is emitted forward from the opening onto the code reading surface and reflected thereon, with the housing being held in such a manner that the guide portion is brought into contact with the code reading surface and a rear portion of the housing is slightly lifted from the code reading surface.

2. The portable reading apparatus according to claim 1, wherein the guide portion comprises a portion projecting forward from the opening and serving as a position determiner, and maintaining a substantially constant distance between the opening and the code reading surface.

3. The portable reading apparatus according to claim 1, wherein an upper region of the distal end portion of the housing is slanted downward with respect to the housing such that the code recorded on the code reading surface is visible from a direction above and behind the housing when the guide portion is in contact with the code reading surface and the rear portion of the housing is slightly lifted with respect to the code reading surface.

4. The portable reading apparatus according to claim 1, wherein the laser light beam emission module is arranged on a bottom surface of a substrate which is positioned substantially in the middle of the housing with respect to a height thereof so as to emit the laser light beam substantially in parallel with respect to the bottom surface of the housing.

5. A portable reading apparatus for scan-reading a code using a laser light beam, comprising:

a substantially flat, thin, elongated housing;

a laser light beam emission module arranged inside the housing which emits the laser light beam in a substantially longitudinal direction of the housing through an opening provided in a distal end portion of the housing;

a guide portion provided on a lower region of an edge of the opening which guides the edge of the opening; and a light detection unit arranged inside the housing which reads the code recorded on a code reading surface by detecting a laser light beam which is emitted forward from the opening onto the code reading surface and reflected thereon, with the housing being held in such a manner that the guide portion is brought into contact with the code reading surface and a rear portion of the housing is slightly lifted from the code reading surface, wherein an upper region of the distal end portion of the housing is slanted downward with respect to the housing such that the code recorded on the code reading surface is visible from a direction above and behind the housing when the guide portion is brought into contact with the code reading surface and the rear portion of the housing is slightly lifted with respect to the code reading surface.

6. A portable reading apparatus for scan-reading a code using a laser light beam, comprising:

a substantially flat, thin, elongated housing;

a laser light beam emission module arranged in the housing which emits a laser light beam through an opening provided in a lower region of a distal end portion of the housing, forward and in parallel to a longitudinal direction of the housing, and downward;

a guide portion provided on a lower region of an edge of the opening which guides the edge of the opening; and a light detection unit which reads the code recorded on a code reading surface by detecting a light beam which is emitted slightly downward from the opening onto the code reading surface and reflected thereon, with the housing being held in such a manner that the guide portion is in contact with the code reading surface and a rear portion of the housing is slightly lifted from the code reading surface.

7. The portable reading apparatus according to claim 6, wherein the laser light beam emission module is arranged on a bottom surface of a substrate which is positioned in the housing such that the laser light beam is emitted forward and in parallel with respect to the longitudinal direction of the housing and slightly downward.

8. A portable reading apparatus for scan-reading a code using a laser light beam, comprising:

a small, thin, elongated substantially flat housing having a reading opening provided in a distal end portion thereof, through which the laser light beam is emitted substantially forward with respect to the longitudinal direction of the housing from a laser light beam emission module arranged in the housing, wherein:

a guide portion is provided on a lower front region of the reading opening of the housing, which serves as a position determining device which guides an edge of the reading opening to emit the laser light beam onto a code recording medium and which maintains a substantially constant distance between the reading opening and the code recording medium; and an upper region of the housing reading opening is slanted down such that the code recording medium is visible from a direction above and behind the housing when the housing is held in such a manner that the guide portion is in contact with the code recording medium and the rear portion of the housing is slightly lifted from the code recording medium.

9. A portable reading apparatus for scan-reading a code using a laser light beam, comprising:

a small, thin, elongated substantially flat housing having a reading opening provided in a distal end portion thereof, through which the laser light beam is emitted substantially forward with respect to a longitudinal direction of the housing from a laser light beam emission module arranged in the housing, wherein:

a guide portion is provided on a lower front region of the reading opening of the housing, which serves as a position determiner, and which guides the reading opening to emit the laser light beam onto a code recording medium and which maintains a substantially constant distance between the reading opening and the code recording medium; and the laser light beam emission module is arranged in the housing in such a manner that emission of the laser light beam is performed at a specific emission angle in a direction slightly downward with respect to the longitudinal direction of the housing onto the code recording medium which is located slightly behind an edge of the reading opening.

10. A portable reading apparatus for scan-reading a code using a laser light beam, comprising:

a small, thin, elongated substantially flat housing;

a laser light beam emission module arranged in a lower region of the housing which emits the laser light beam substantially in parallel with respect to a bottom surface of the housing and which sends the laser light beam out of the housing substantially in a longitudinal direction thereof, an opening being provided on a lower region of a distal end portion of the housing through which the laser light beam is emitted from the laser light beam emission module substantially forward in the longitudinal direction of the housing;

a guide portion provided on a lower region of an edge of the opening which guides the edge of the opening; and a light detection unit arranged in the housing which reads a code on a code reading surface that is positioned away from the apparatus by detecting a light beam which is aimed at and emitted onto the code reading surface away from the apparatus and reflected thereon, and reading a code on a code reading surface which is positioned close to the apparatus by detecting a laser light beam which is emitted forward onto the code reading surface close to the apparatus and reflected thereon, with the housing being held in such a manner that the guide portion is in contact with the code reading surface close to the apparatus and a rear portion of the housing is slightly lifted from the code reading surface.

11. A portable reading apparatus for scan-reading a code using a laser light beam, comprising:

a small, thin, elongated substantially flat housing;

a reading opening provided in a distal end portion of the housing through which the laser light beam is emitted forward from a laser light beam emission module, that is provided in the housing, in a longitudinal direction of the housing;

a guide portion provided on a lower region of an edge of the reading opening for guiding the edge of the reading opening; and a light detection unit arranged in the housing which reads a code on a code reading medium which is positioned away from the apparatus by detecting a light beam which is aimed at and emitted onto the code reading medium away from the apparatus and reflected thereon, and reading a code on a code reading medium which is positioned close to the apparatus by detecting a laser light beam which is emitted forward onto the code reading medium close to the apparatus and reflected thereon, with the housing being held in such a manner that the guide portion is in contact with the code reading medium and a rear portion of the housing is slightly lifted from the code reading medium, wherein an upper region of the reading opening is slanted downward with respect to the housing such that the code recording medium positioned close to the apparatus is visible from a direction above and behind the housing when the guide portion is in contact with the code recording medium and a rear portion of the housing is lifted with respect to the code recording medium.

* * * * *